US012525364B2

(12) United States Patent
Stubsgaard et al.

(10) Patent No.: US 12,525,364 B2
(45) Date of Patent: Jan. 13, 2026

(54) MOLTEN SALT NUCLEAR REACTOR CORE HAVING A BULBOUS SHAPE

(71) Applicant: Copenhagen Atomics A/S, Kastrup (DK)

(72) Inventors: Aslak Stubsgaard, Copenhagen K (DK); Thomas Jam Pedersen, Copenhagen K (DK)

(73) Assignee: Copenhagen Atomics A/S, Kastrup (DK)

( * ) Notice: Subject to any disclaimer, the term of this patent is extended or adjusted under 35 U.S.C. 154(b) by 0 days.

(21) Appl. No.: 18/564,489

(22) PCT Filed: May 25, 2022

(86) PCT No.: PCT/DK2022/050109
§ 371 (c)(1),
(2) Date: Nov. 27, 2023

(87) PCT Pub. No.: WO2022/253392
PCT Pub. Date: Dec. 8, 2022

(65) Prior Publication Data
US 2024/0257988 A1    Aug. 1, 2024

(30) Foreign Application Priority Data

May 31, 2021 (DK) .............................. PA202170280
May 31, 2021 (DK) .............................. PA202170281
May 31, 2021 (DK) .............................. PA202170282

(51) Int. Cl.
*G21C 5/14*    (2006.01)
*G21C 1/22*    (2006.01)
(Continued)

(52) U.S. Cl.
CPC .............. *G21C 1/22* (2013.01); *G21C 5/14* (2013.01); *G21C 11/06* (2013.01); *G21C 13/0875* (2013.01)

(58) Field of Classification Search
CPC .................................... G21C 3/54; G21C 5/14
See application file for complete search history.

(56) References Cited

U.S. PATENT DOCUMENTS 3,009,866 A * 11/1961 Fraas ...................... G21C 1/24
                                                            376/310
3,309,279 A *  3/1967 Ritz ........................ G21D 5/06
                                                         976/DIG. 18
(Continued)

FOREIGN PATENT DOCUMENTS

| CN | 104145309 | 11/2014 |
| CN | 105027224 | 11/2015 |

(Continued)

OTHER PUBLICATIONS

Office Action dated Apr. 30, 2024 from Canadian Application No. 3221998.
(Continued)

*Primary Examiner* — Lily C Garner
(74) *Attorney, Agent, or Firm* — Crockett & Crockett, PC; K. David Crockett, Esq.

(57) ABSTRACT

A nuclear reactor core (1) for a molten salt nuclear reactor (100). The nuclear reactor core (1) has a tubular cylindrical center moderator vessel (10) for passage of a liquid moderator (11), a cylindrical fuel salt jacket surrounding the center moderator vessel (10), and a cylindrical neutron reflector jacket surrounding the cylindrical fuel salt jacket, wherein the cylindrical center moderator and neutron reflector vessel (10) has a largest inner cross-sectional area medially between a liquid moderator and neutron reflector inlet (12) of the center moderator and neutron reflector (Continued)

vessel (10) and a liquid moderator and neutron reflector outlet (13) of the moderator and neutron reflector vessel (10).

29 Claims, 11 Drawing Sheets

(51) Int. Cl.
  *G21C 11/06* (2006.01)
  *G21C 13/087* (2006.01)

(56) References Cited

U.S. PATENT DOCUMENTS

| | | | | |
|---|---|---|---|---|
| 3,390,211 | A * | 6/1968 | Ziegler | G21C 13/0933 52/742.16 |
| 3,397,113 | A * | 8/1968 | Stafford | G21C 13/00 976/DIG. 294 |
| 9,460,820 | B2 * | 10/2016 | Shimazu | G21C 11/02 |
| 10,096,387 | B2 * | 10/2018 | Bennion | G21D 1/00 |
| 11,227,694 | B2 * | 1/2022 | Cinotti | G21C 5/10 |
| 2012/0183112 | A1 * | 7/2012 | Leblanc | G21C 3/22 376/172 |
| 2015/0036779 | A1 | 2/2015 | Leblanc | |
| 2016/0189806 | A1 * | 6/2016 | Cheatham, III | G21C 1/03 376/213 |
| 2017/0301416 | A1 | 10/2017 | Hansen | |
| 2017/0301421 | A1 * | 10/2017 | Abbott | G21C 15/28 |
| 2018/0068750 | A1 * | 3/2018 | Cisneros | G21C 7/27 |
| 2020/0105424 | A1 | 4/2020 | Schönfeldt et al. | |
| 2020/0211724 | A1 * | 7/2020 | Cisneros, Jr. | G21C 15/28 |

FOREIGN PATENT DOCUMENTS

| | | | |
|---|---|---|---|
| CN | 106158052 | 11/2016 | |
| CN | 106981319 | 7/2017 | |
| CN | 108352200 | 7/2018 | |
| CN | 108780666 | 11/2018 | |
| CN | 208385016 | 1/2019 | |
| CN | 110110392 | 8/2019 | |
| CN | 110178186 | 8/2019 | |
| CN | 112259263 | 1/2021 | |
| CN | 112259263 A * | 1/2021 | G21C 15/02 |
| CN | 112349436 | 2/2021 | |
| JP | 2015175315 | 10/2015 | |
| JP | 2016517916 | 6/2016 | |
| JP | 2019516970 | 6/2019 | |
| JP | 202091178 | 6/2020 | |
| JP | 2020524289 | 8/2020 | |
| WO | WO-2009135286 A1 * | 11/2009 | G21C 1/22 |
| WO | WO2018071081 | 4/2018 | |
| WO | WO2020157247 | 8/2020 | |

OTHER PUBLICATIONS

International Search Report and Written Opinion dated Jul. 21, 2022 from International Application No. PCT/DK2022/050109.
Office Action dated Jul. 4, 2024 from Korean Patent Application No. 1020247000022.
Office Action dated Jul. 2, 2024 from Chinese Patent Application No. 202280038952.5.
Yu, et al., Conceptual Design of Mars Molten Salt Reactor, 43 Nuclear Techniques 050603-1, May 2020.
Zeng, et al., Design and Simulation of Internal Model Controller for Liquid Molten Salt Reactor Core Power, 54 Atomic Energy Science and Technology 937, May 2020.
Zhou, et al., Core Flow Distribution Design of Molten Salt Reactor With Liquid Fuel, 39 Nuclear Techniques 050601-1, May 2016.
Uhlír, Chemistry and Technology of Molten Salt Reactors—History and Perspectives, 360 Journal of Nuclear Materials 6, (2007).
Tataurov, et al., Molten Salt Reactor For 99Mo Production, 122 Atomic Energy 299, Sep. 2017.
Office Action dated Jun. 28, 204 from Brazilian Patent Application No. 1220230252195.
Office Action dated Jun. 27, 2024 from Brazilian Patent Application No. 1120230250056.
Examination Report No. 1 dated Oct. 8, 2024 from Australian Patent Application No. 2022284200.
International Atomic Energy Agency, Advances in Small Modular Reactor Technology Developments, A Supplement to: IAEA Advanced Reactors Information System (ARIS) (2020).
Notice of Reasons for Refusal with Search Report dated Sep. 4, 2024 from Japanese Patent Application No. 2023-573101.
Office Action dated Dec. 19, 2024 from Saudi Arabian Patent Application No. 523451718.
Office Action dated Dec. 2, 2024 from Australian Patent Application No. 2022284200.
Office Action dated Jan. 3, 2025 from Korean Patent Application No. 1020247000022.

* cited by examiner

MOLTEN SALT NUCLEAR REACTOR CORE HAVING A BULBOUS SHAPE

TECHNICAL FIELD

The disclosure relates to a molten salt nuclear reactor core and method of operating such nuclear reactor core, in particular to the construction and design of the nuclear reactor core of a molten salt nuclear reactor and method of operating such nuclear reactor core.

BACKGROUND

A molten salt reactor (MSR) is a nuclear reactor where the nuclear reactor coolant and/or the nuclear fuel is a molten salt, typically a fluoride or chloride salt, with a melting point of around ~500° C., operating temperature of around ~600 to 700° C., and a boiling point of ~1000° C. above the melting point. One of the many advantages of this type of reactor is that molten salts can be used as the heat transfer media at very high temperatures while still operating at or close to atmospheric pressure. Heat can be extracted from such reactors by pumping the molten salt in a loop between the nuclear reactor core and a heat exchanger with the reactor power being directly proportional to the temperature drop across the heat exchanger and the flow rate. Due to the corrosive nature of molten fluoride and chloride salt, their operation requires an inert containment atmosphere, furthermore molten salt or molten salt vapors cannot be allowed to escape to the environment, putting strict requirements on molten salt reactor components to be completely leak tight. This poses a severe technical challenge, since the temperature and the aggressive nature of the molten salt combined with high radiation levels renders only very few suitable materials to work with. Thus, the materials that can be used to construct the core have to be carefully selected and combined in order to obtain a solution that provides a reliable and durable nuclear reactor core.

Molten salt reactors were built and operated at Oak Ridge National Laboratory (ORNL) in the 1950s and 1960s with a research program lasting to the 1970s and other small programs around the world.

The nuclear reactor core has a special geometry designed to allow a nuclear chain reaction to take place, achieved by either 1. a large enough amount of fuel to make a critical assembly or by
2. combining enough moderator and fuel to make a critical assembly.

These are respectively called fast and thermal reactors because of the resulting neutron spectrum that each type exhibits.

There is a need for compact and mass manufacturable molten salt breeder reactors in order to achieve the goal of meeting the future global energy demand in a sustainable fashion. This creates a significant challenge since the smaller one makes a reactor the harder it becomes for it to achieve breeding, since the probability of neutrons leaving the reactor, referred to as neutron leakage, roughly increases with the larger surface area to volume ratio of a small reactor.

Fast reactors generally require a much larger fissile inventory to become critical when compared to thermal reactors and are thus not well suited to scale up rapidly to meet future energy demand because of limited availability of fissile material. Thus, a compact and mass manufacturable thermal molten salt breeder reactor is desired.

One of the challenges for thermal molten salt breeder reactors is the need for a moderator that effectively slows down neutrons while allowing for breeding, which means that only moderators based on carbon, beryllium, or deuterium can be used. The only practical moderators that will allow breeding in a thermal spectrum molten salt reactor are: solid carbon, solid beryllium, molten enriched lithium 7 deuteroxide salt (7LiOD), or liquid heavy water (D20). Of these, carbon is the only one that can withstand direct contact with the fuel salt, while the others need to have a structural material separating them from the fuel salt. All these moderators have their pros and cons and have been proposed and studied in the past for use as moderators in a molten salt reactor.

Another challenge is the choice of materials for the vessels that contain the fuel salt or moderator material if the moderator is separated from the fuel salt. The materials need to resist degradation under extremely high temperatures, intense radiation exposure, and must have suitable neutron absorption properties as well as resistance to the corrosive effect of molten salt for the vessels containing molten salt. Various materials have been proposed and studied in the past for use in the construction of the components of a molten salt reactor. However, each of these materials has practical limitations in relation to the shapes that are possible to produce in commercial manufacturing.

The only known molten salt compatible materials with low neutron absorption are carbon and silicon carbide based materials. The most promising of these are the ceramic composites of silicon carbide and carbon, e.g. carbon fiber-carbon matrix C/C composite, silicon carbide fiber-silicon carbide matrix (SiC/SiC) composite, and silicon carbide fiber-carbon matrix (SiC/C) composite. The construction of complex shaped composite materials is much more challenging than from metals since these complex shaped composite materials cannot be bent and or welded in their final form but rather have to be molded to shape and treated in multiple steps, e.g. furnace firing.

CN112259263A discloses a nuclear reactor core with a construction with straight cylindrical vessels, that is relatively easy to construct from suitable materials, but does not provide an effective reactor design that minimizes neutron leakage.

SUMMARY

It is an object to provide a nuclear reactor core for a nuclear reactor that overcomes or at least reduces the problem above.

The foregoing and other objects are achieved by the features of the independent claims. Further implementation forms are apparent from the dependent claims, the description, and the figures.

According to a first aspect, there is provided nuclear reactor core for a molten salt nuclear reactor, the nuclear reactor core comprising:
  a tubular substantially cylindrical center moderator and neutron reflector vessel for passage of a liquid moderator and neutron reflector axially extending from a liquid moderator and neutron reflector inlet to a liquid moderator and neutron reflector outlet,
  a plurality of tubular fuel salt vessels, each tubular fuel salt vessel extending axially from a fuel salt inlet to a fuel salt outlet for passage of a molten fuel salt, the plurality of tubular fuel salt vessels being assembled to form a substantially cylindrical fuel salt jacket surrounding the center moderator and neutron reflector vessel, a plurality of tubular moderator and neutron reflector vessels, each tubular moderator neutron reflector vessel extending axially from a liquid moderator and neutron reflector inlet to a liquid moderator and neutron reflector outlet for passage of a liquid moderator and neutron reflector, the plurality of tubular moderator and neutron reflector vessels being assembled to form a substantially cylindrical moderator and neutron reflector jacket surrounding the substantially cylindrical fuel salt jacket, and the substantially cylindrical center moderator and neutron reflector vessel has a largest inner cross-sectional area medially between the liquid moderator and neutron reflector inlet of the center moderator and neutron reflector vessel and the liquid moderator and neutron reflector outlet of the moderator and neutron reflector vessel.

By constructing the nuclear reactor core with a fuel salt jacket that is formed by a plurality of tubular vessels that, when assembled, form the fuel salt jacket and by constructing the nuclear reactor core with a neutron reflector jacket that is formed by a plurality of tubular vessels than when assembled form the neutron reflector jacket, it becomes possible to construct a nuclear reactor core with a design of concentric cylinders that can have a varying radius to allow a larger volume in the respective concentric spaces between the respective cylinders in which the moderator and reflector liquid and the molten fuel salt is received for achieving a critical assembly and reducing neutron leakage, i.e. an efficient reactor geometry, while still being able to manufacture from materials that are suitable for use in a molten salt nuclear reactor. The components are made from materials that typically need to be made in a mold which in turn poses a range of restrictions in the design for these components. The core construction according to the present invention allows these components to be designed in such a way that they can be manufactured from suitable materials, such as ceramics composite and metal alloy, preferably zirconium alloy. The construction of the nuclear reactor core according to the first aspect allows for an optimized core design with an efficient reactor geometry where only a small amount of fuel salt is needed to create a critical reactor assembly while still being practical to assemble and also allowing for a sufficient fuel salt circulation rate to extract the produced heat, with the substantially cylindrical center moderator and neutron reflector vessel having a largest inner cross-sectional area medially between the liquid moderator inlet and the liquid moderator and neutron reflector outlet.

In a possible implementation of the first aspect, the ceramic composite material is a ceramic matrix composite.

In a possible implementation of the first aspect, the ceramic composite material is a ceramic composite of silicon carbide and carbon, preferably a carbon fiber-carbon matrix (C/C) composite, silicon carbide fiber-silicon carbide matrix (SiC/SiC) composite, and/or silicon carbide fiber-carbon matrix (SiC/C) composite.

In a possible implementation form of the first aspect, at least in a portion of the axial extent of the center moderator and neutron reflector vessel the inner cross-sectional area of the center moderator and neutron reflector vessel increases gradually towards the medial position between the liquid moderator and neutron reflector inlet and the liquid moderator and neutron reflector outlet. The inner cross-sectional area preferably varying continuously between the moderator and neutron reflector inlet and the moderator and neutron reflector outlet at least in a portion of the axial extent of the center moderator and neutron reflector vessel.

In a possible implementation form of the first aspect, the substantially cylindrical center moderator and neutron reflector vessel and/or the liquid moderator and neutron reflector vessels have a wall of a metal alloy, preferably iron alloy, preferably stainless steel and most preferably zirconium alloy or ceramic composite material, and wherein the fuel salt vessels preferably having a wall of ceramic composite material, a metal alloy, an iron alloy, preferably stainless steel, or nickel alloy, preferably Inconel® or Hastelloy®.

In a possible implementation form of the first aspect, each fuel salt vessel in the fuel salt jacket is substantially identical to the other fuel salt vessels in the fuel salt jacket.

In a possible implementation form of the first aspect, each moderator and neutron reflector vessel in the moderator and neutron reflector jacket is substantially identical to the other moderator and neutron reflector vessels in the moderator and neutron reflector jacket.

In a possible implementation form of the first aspect, a first substantially cylindrical insulation jacket is provided between the center moderator vessel and the fuel salt jacket, the first insulation jacket preferably being formed by one or more first insulation members, the first insulation members preferably being shaped like sectors of the first substantially cylindrical insulation jacket or shaped as a strip that is spirally wound around the center moderator vessel, and the first insulation members preferably made being of a graphite felt or insulation aerogel impregnated graphite felt. The insulation allows a much lower heat loss to the moderator and neutron reflector liquid and for the moderator and neutron reflector liquid to be consistently kept operating at a much lower temperature than the fuel salt, which is in particular a significant advantage if a hydroxide or deuteroxide moderator is used, due to the reduced corrosive effect at lower temperatures.

In a possible implementation form of the first aspect, the second substantially cylindrical insulation jacket is provided between the fuel salt jacket and the moderator and neutron reflector jacket, the second insulation jacket preferably being formed by one or more second insulation members, the second insulation members preferably being shaped like sectors of the second substantially cylindrical insulation jacket or shaped as a strip that is spirally wound around the fuel salt jacket, and the second insulation members preferably being made of a graphite felt or insulation aerogel impregnated graphite felt.

In a possible implementation form of the first aspect, the nuclear reactor core comprises a plurality of tubular blanket salt vessels, each tubular blanket salt vessel extending axially from an inlet to an outlet for passage of a molten blanket salt, the plurality of tubular blanket salt vessels being assembled to form a substantially cylindrical blanket salt jacket surrounding the moderator and neutron reflector jacket.

In a possible implementation form of the first aspect, a third substantially cylindrical insulation jacket is provided between the neutron reflector vessel and the blanket salt jacket, the third insulation jacket preferably being formed by one or more third insulation members, the third insulation members preferably being shaped like sectors of the third substantially cylindrical insulation jacket or shaped as a strip that is spirally wound around the moderator and neutron reflector jacket, and the third insulation members preferably being made of a graphite felt or insulation aerogel impregnated graphite felt.

In a possible implementation form of the first aspect, the graphite felt or insulation aerogel impregnated graphite felt of the first, second, or a third substantially cylindrical insulation jacket is clad in sheet metal, preferably sheet metal with a thickness of approximately 0.01 to 0.1 mm, for eliminating or at least reducing the risk of salt wicking.

In a possible implementation form of the first aspect, the center moderator and neutron reflector vessel, the fuel salt vessels, the moderator and neutron reflector vessels, and/or the blanket salt vessels are each assembled from two parts that are separated by a symmetry plane M that extends radially from the medial position.

In a possible implementation form of the first aspect, the center moderator and neutron reflector vessel has a variable inner and outer radii R11 and R12, the inner and outer radii R11 and R12 preferably being largest at or near the medial position and gradually decreasing from the medial position.

In a possible implementation form of the first aspect, the fuel salt jacket is shaped as a hollow circular cylinder with variable inner and outer radii R21 and R22, and wherein the fuel salt vessels are preferably shaped as a substantially circular cylindrical sector with variable inner and outer radii R21 and R22 or effective radii R21' and R22', respectively, and a given sector angle A2, the inner and outer radii R21 and R22 or effective radii R21' and R22' preferably being largest at or near the medial position and gradually decreasing from the medial position.

In a possible implementation form of the first aspect, the moderator and neutron reflector jacket is shaped like a hollow circular cylinder with variable inner and outer radii R31 and R32, and wherein the moderator neutron reflector vessel are preferably shaped like a substantially circular cylindrical sector with variable inner and outer radii R31 and R32 or effective radii R31' and R32', respectively, and a given sector angle A3, the inner and outer radii R31 and R32 or effective radii R31' and R32' preferably being largest at or near the medial position and gradually decreasing from the medial position.

In a possible implementation form of the first aspect, the blanket salt jacket is shaped as a hollow circular cylinder with variable inner and outer radii R41 and R42 or effective radii R41' and R42', and wherein the blanket salt vessels is shaped like a substantially circular cylindrical sector with variable inner and outer radii R41 and R42 or effective radii R41' and R42', respectively, and a given sector angle A4, the inner and outer radii R41 and R42 or effective radii R41' and R42' preferably being largest at or near the medial position and gradually decreasing from the medial position.

In a possible implementation form of the first aspect, the fuel salt jacket, the neutron reflector jacket, and/or the blanket jacket are circumferentially potentially continuous jackets, preferably formed by the matching sides of the tubular vessels forming these jackets touching one another along a substantial portion of their axial extent.

In a possible implementation form of the first aspect, the center moderator vessel is segmented and formed by a plurality of tubular moderator vessels, each moderator vessel extending axially from a moderator inlet to a moderator outlet for passage of a moderator, the plurality of tubular moderator vessels being assembled to form the center moderator vessel.

In a possible implementation form of the first aspect, the center moderator vessel has a circumferential outer wall and a circumferential inner wall, the circumferential inner wall preferably creating a lumen for receiving a control rod.

In a possible implementation form of the first aspect, the liquid moderator is heavy water.

In a possible implementation form of the first aspect, the fuel salt comprises fissile components, preferably comprising enriched lithium 7 fluoride, thorium tetrafluoride, uranium tetrafluoride, uranium trifluoride and/or plutonium trifluoride (7LiF)-(ThF4)-(UF4)-(UF3)-(PuF3) salt.

In a possible implementation form of the first aspect, the blanket salt is a molten salt comprising fertile components, preferably comprising enriched lithium 7 fluoride and/or thorium tetrafluoride (7LiF)-(ThF4) salt.

In a possible implementation form of the first aspect, the nuclear reactor core is provided with movable neutron absorbing control elements between vessels of the jackets, preferably between vessels making up the fuel salt jacket and/or between vessels forming a jacket that surrounds the fuel jacket or is surrounded by the fuel jacket. The neutron absorbing control elements being similar to control rods, except that the neutron absorbing control elements are not rod-shaped but are shaped like a plate or wedge to match the adjacent vessels in the jacket concerned, and are arranged such that they can be inserted into and retracted from the nuclear reactor core, for controlling nuclear reactivity of the nuclear reactor core.

In a possible implementation form of the first aspect, a second fuel salt jacket surrounds the moderator and neutron reflector jacket, and a second moderator and neutron reflector jacket surrounds the second fuel salt jacket. In this implementation, the blanket jacket, if present, surrounds the second neutron reflector jacket. In this implementation, the second fuel salt jacket is formed by a plurality of tubular fuel salt vessels, each tubular fuel salt vessel extending axially from a fuel salt inlet to a fuel salt outlet for passage of a molten fuel salt, the plurality of tubular fuel salt vessels being assembled to form a second cylindrical fuel salt jacket surrounding the moderator and neutron reflector jacket. The second neutron reflector jacket is formed by a plurality of tubular moderator and neutron reflector vessels. Each tubular moderator neutron reflector vessel extending axially from a liquid moderator and neutron reflector inlet to a liquid moderator and neutron reflector outlet for passage of a liquid moderator and neutron reflector.

It is another object of the invention to provide a method of operating a nuclear reactor core that overcomes or at least reduces the problems mentioned above.

According to a second aspect, there is provided a method of operating a nuclear reactor core of a molten salt nuclear reactor, the nuclear reactor core comprising:
  a tubular cylindrical center moderator and neutron reflector vessel for passage of a liquid moderator and neutron reflector axially extending from a liquid moderator and neutron reflector inlet to a liquid moderator and neutron reflector outlet,
  a cylindrical fuel salt jacket surrounding the center moderator vessel, the fuel salt jacket extending axially from a fuel salt inlet to a fuel salt outlet for passage of a molten fuel salt, and
  a cylindrical moderator and neutron reflector jacket surrounding the fuel salt jacket, the moderator and neutron reflector jacket extending axially from the liquid moderator and neutron reflector inlet to a moderator and neutron reflector outlet for passage of a liquid moderator and neutron reflector,
  the method comprising:

controlling the temperature of the fuel salt in the fuel salt jacket to remain at a temperature between approximately 600 and 700° C., controlling the temperature of the moderator and neutron reflector liquid in the central moderator and neutron reflector vessel to remain at a temperature between approximately 10 and 90° C., and preferably controlling the temperature of the moderator and neutron reflector liquid in the moderator neutron reflector jacket to remain at a temperature between approximately 10 and 90° C.

By controlling the temperature of the moderator between approximately 90° C., the moderator and neutron reflector, typically heavy water, does not need to be pressurized to prevent it from boiling. Thus, the vessels that contain the moderator and neutron reflector will not need to act as a pressure vessel and can thus be constructed in a much lighter and less solid way. This is a significant advantage, since the suitable materials that have the required properties are difficult for use in a construction that needs to be able to withstand pressure (pressure vessel). Thus, the construction of the nuclear core is significantly facilitated.

In a possible implementation form of the second aspect, the method comprises:

adjusting the liquid level or mass of the liquid moderator and neutron reflector in the center moderator and neutron reflector vessel, and/or adjusting the liquid level or mass of the liquid moderator and neutron reflector in the moderator and neutron reflector jacket, and/or adjusting the liquid level or mass of the molten blanket salt in the blanket salt jacket, and/or adjusting the temperature of fuel salt in the fuel jacket, and/or adjusting the temperature of the liquid moderator and neutron reflector in the center moderator and neutron reflector vessel, and/or adjusting the temperature of the liquid moderator and neutron reflector in the moderator and neutron reflector jacket, and/or adjusting the chemical composition of the liquid moderator and neutron reflector, and/or adjusting the chemical composition of the fuel salt, and/or adjusting the flow rate of the liquid moderator and neutron reflector in the center moderator and neutron reflector vessel, and/or adjusting the position of a control rod that is at least partially inserted in a lumen in the center moderator and neutron reflector vessel, and/or adjusting the position of a control rod that is at least partially inserted between fuel salt vessels, and/or adjusting the position of a control rod that is at least partially inserted between moderator and neutron absorption vessels.

In a possible implementation form of the second aspect, the control rod is of a neutron absorbing material such as boron or hafnium.

In a possible implementation form of the second aspect, the liquid moderator is heavy water.

In a possible implementation form of the second aspect, the fuel salt comprises fissile components, preferably comprising enriched lithium 7 fluoride, thorium tetrafluoride, uranium tetrafluoride, uranium trifluoride and/or plutonium trifluoride (7LiF)-(ThF4)-(UF4)-(UF3)-(PuF3) salt.

In a possible implementation form of the second aspect, the blanket salt is a molten salt comprising fertile components, preferably comprising enriched lithium 7 fluoride and/or thorium tetrafluoride (7LiF)-(ThF4) salt.

According to a third aspect, there is provided a molten salt nuclear reactor comprising a controller configured to perform the method according to the second aspect or any possible implementations of the second aspect.

It is another object of the invention to provide a nuclear reactor core that overcomes or at least reduces the problems mentioned above.

According to a fourth aspect, there is provided nuclear reactor core of a molten salt nuclear reactor, the nuclear reactor core comprising:

a tubular cylindrical center moderator and neutron reflector vessel for passage of a liquid moderator and neutron reflector axially extending from a liquid moderator and neutron reflector inlet to a liquid moderator and neutron reflector outlet, the center moderator and neutron reflector vessel having a wall of metal alloy, preferably zirconium alloy or ceramic composite material, a cylindrical fuel salt jacket surrounding the center moderator vessel, the fuel salt jacket extending axially from a fuel salt inlet to a fuel salt outlet for passage of a molten fuel salt, the fuel salt jacket having walls of ceramic composite material or of a metal alloy, preferably zirconium alloy, and a cylindrical moderator and neutron reflector jacket surrounding the fuel salt jacket, the moderator and neutron reflector jacket extending axially from the liquid moderator and neutron reflector inlet to a moderator and neutron reflector outlet for passage of a liquid moderator and neutron reflector, the moderator and neutron reflector jacket having walls of metal alloy, preferably zirconium alloy or ceramic composite material.

The choice of materials for the vessels, and the fourth aspect ensures relatively low neutron absorption by the vessels while still providing good tolerance towards the molten salts and moderator liquids.

In a possible implementation form of the fourth aspect, the nuclear reactor core comprises a first cylindrical insulation jacket between the center moderator vessel and the fuel salt jacket, the first insulation jacket comprising graphite felt or insulation aerogel impregnated graphite felt, or other high temperature insulation material, such as ceramic fiber insulation.

In a possible implementation form of the fourth aspect, the nuclear reactor core comprises a second cylindrical insulation jacket between the fuel salt jacket and the moderator neutron reflector jacket, the second insulation jacket comprising graphite felt or insulation aerogel impregnated graphite felt.

In a possible implementation form of the fourth aspect, the liquid moderator and neutron reflector is heavy water or a molten hydroxide, preferably molten enriched lithium 7 deuteroxide salt (7LiOD).

In a possible implementation form of the fourth aspect, the control rod comprises a neutron absorbing material, preferably boron or hafnium.

In a possible implementation form of the fourth aspect, the fuel salt comprises fissile components, preferably comprising enriched lithium 7 fluoride, thorium tetrafluoride, uranium tetrafluoride, uranium trifluoride and/or plutonium trifluoride 7LiF-ThF4-UF4-UF3-PuF3 salt.

In a possible implementation form of the fourth aspect, the blanket is a molten salt comprising fertile components, preferably comprising enriched lithium 7 fluoride and/or thorium tetrafluoride (7LiF-ThF4) salt.

According to a fifth aspect, there is provided a molten salt nuclear reactor comprising a nuclear reactor core according to the fourth aspect or any possible implementations of the fourth aspect.

According to a sixth aspect, there is provided a method of operating a nuclear reactor core of a molten salt nuclear reactor, the nuclear reactor core comprising:

a tubular cylindrical center moderator and neutron reflector vessel for passage of a first liquid moderator and neutron reflector axially extending from a liquid moderator and neutron reflector inlet of the center moderator and neutron reflector vessel to a liquid moderator and neutron reflector outlet of the center moderator and neutron reflector vessel, a cylindrical fuel salt jacket surrounding the center moderator vessel, the fuel salt jacket extending axially from a fuel salt inlet of the cylindrical fuel salt jacket to a fuel salt outlet of the cylindrical fuel salt jacket for passage of a molten fuel salt, and a cylindrical moderator and neutron reflector jacket surrounding the fuel salt jacket, the moderator and neutron reflector jacket extending axially from the liquid moderator and neutron reflector inlet of the cylindrical moderator and neutron reflector jacket to a moderator and neutron reflector outlet of the cylindrical moderator and neutron reflector jacket for passage of a second liquid moderator and neutron reflector, the liquid moderator first and second neutron reflector being a hydroxide moderator, characterized by the method comprising:

controlling the temperature of the fuel salt in the fuel salt jacket to remain at a temperature between approximately 600 and 700° C., the controlling the temperature of the first liquid moderator and neutron reflector in the center moderator and neutron reflector vessel to remain at a temperature between approximately 200 and 700° C., and controlling the temperature of the second liquid moderator and neutron reflector in the moderator and neutron reflector jacket to remain at a temperature between approximately 200 and 700° C.

The foregoing and other objects are achieved by aspects of the present disclosure. Further possible implementation forms are apparent from e.g. the description, and the figures.

BRIEF DESCRIPTION OF THE DRAWINGS

In the following detailed portion of the present disclosure, the aspects, embodiments, and implementations will be explained in more detail with reference to the example embodiments shown in the drawings, in which.

DETAILED DESCRIPTION

Figure 1:
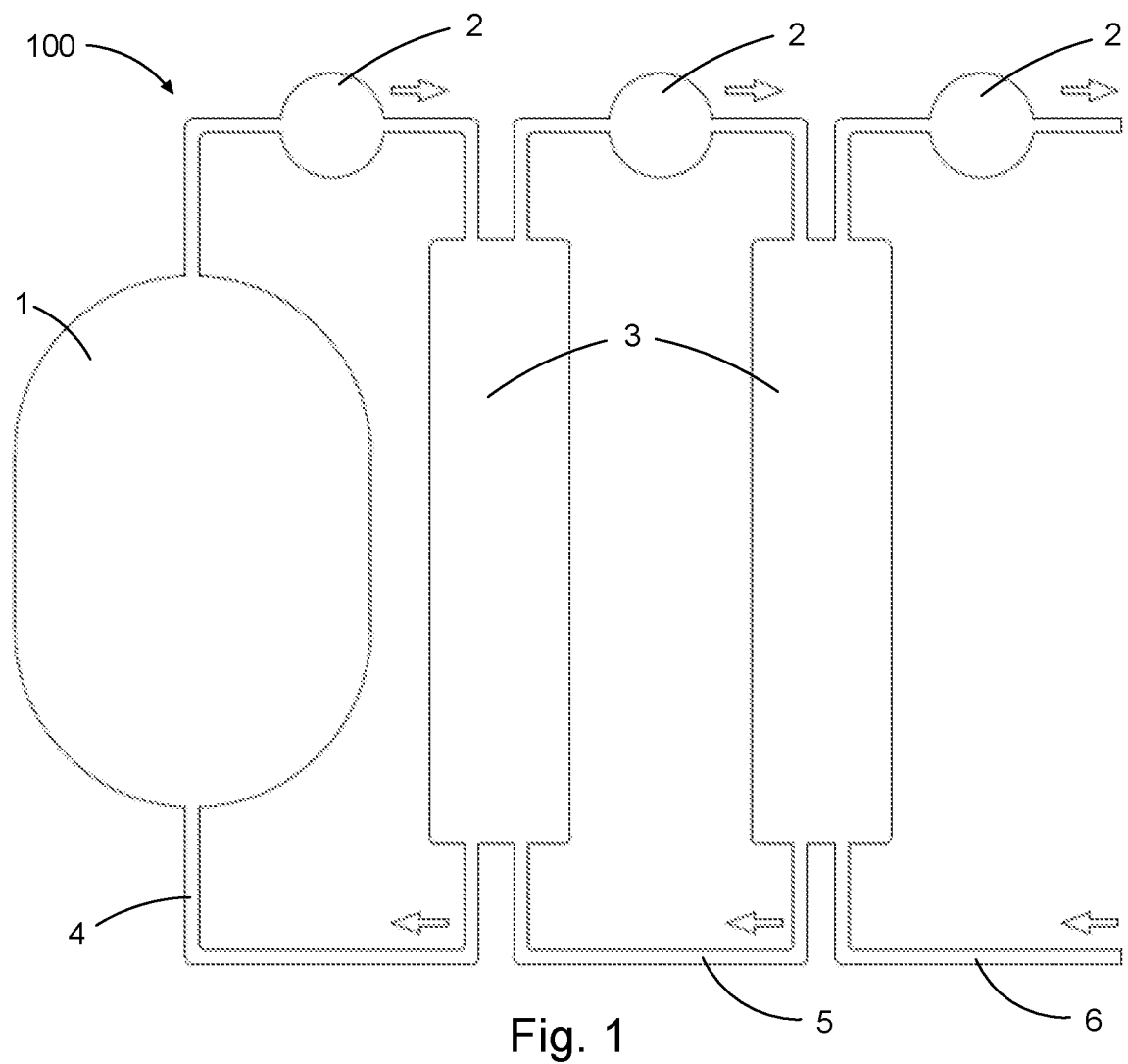
FIG. 1 is a diagrammatic representation of a molten salt reactor with a nuclear reactor core according to an embodiment.
Figure 2:
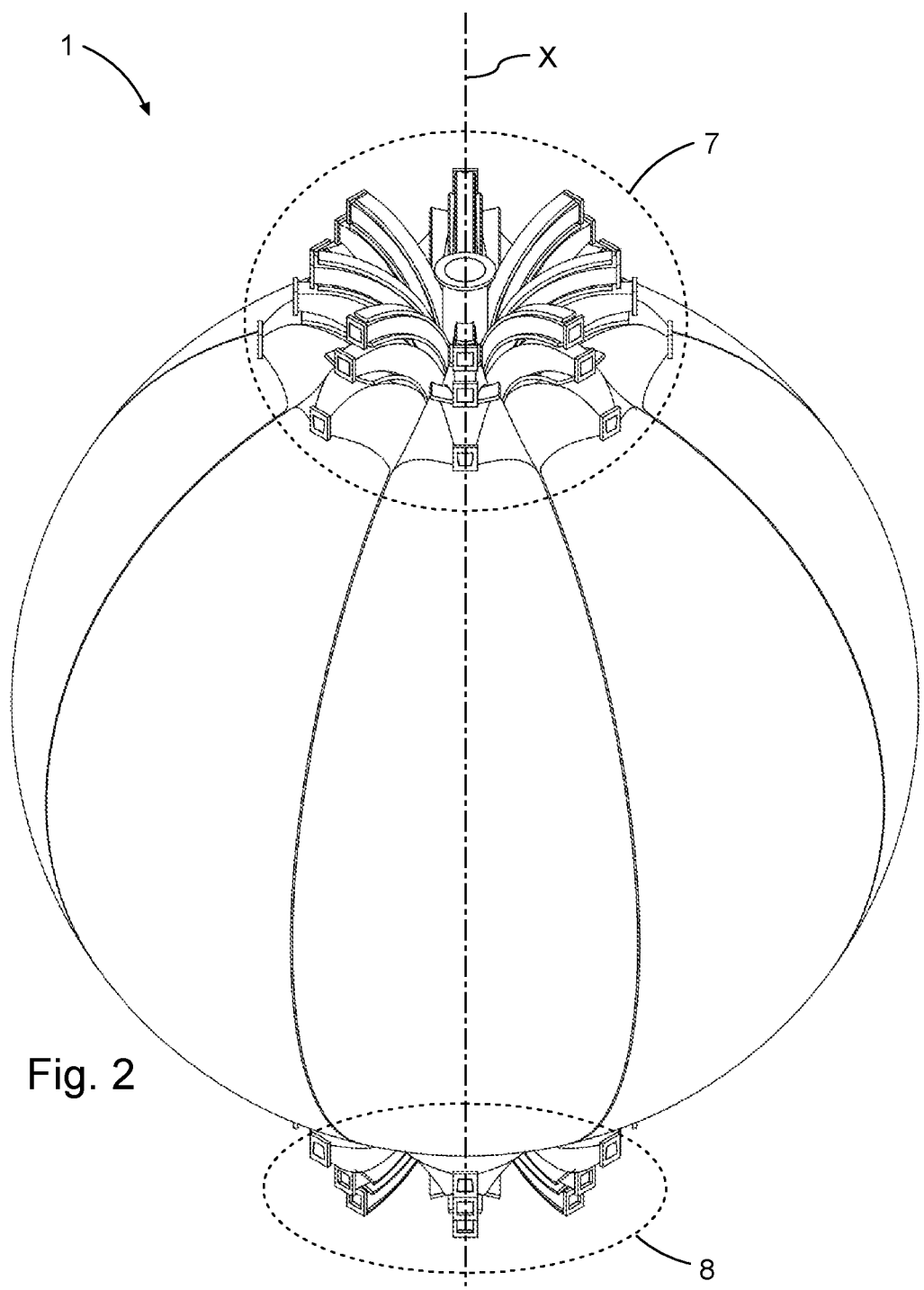
FIG. 2 is an elevated view of a nuclear reactor core according to an embodiment.
Figure 3:
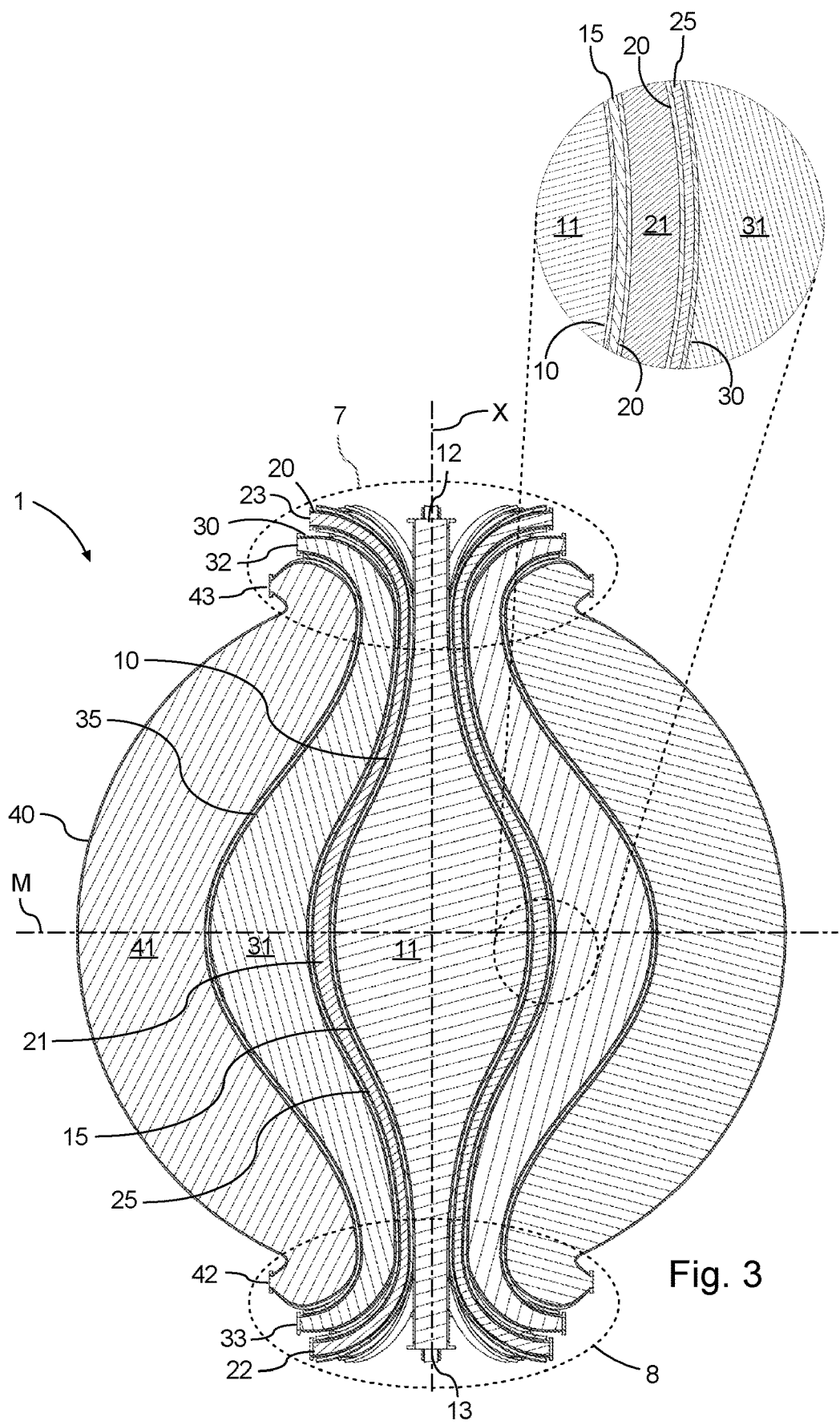
FIG. 3 is a sectional view of the nuclear reactor core of FIG. 2 including an enlarged detail.
Figure 4:
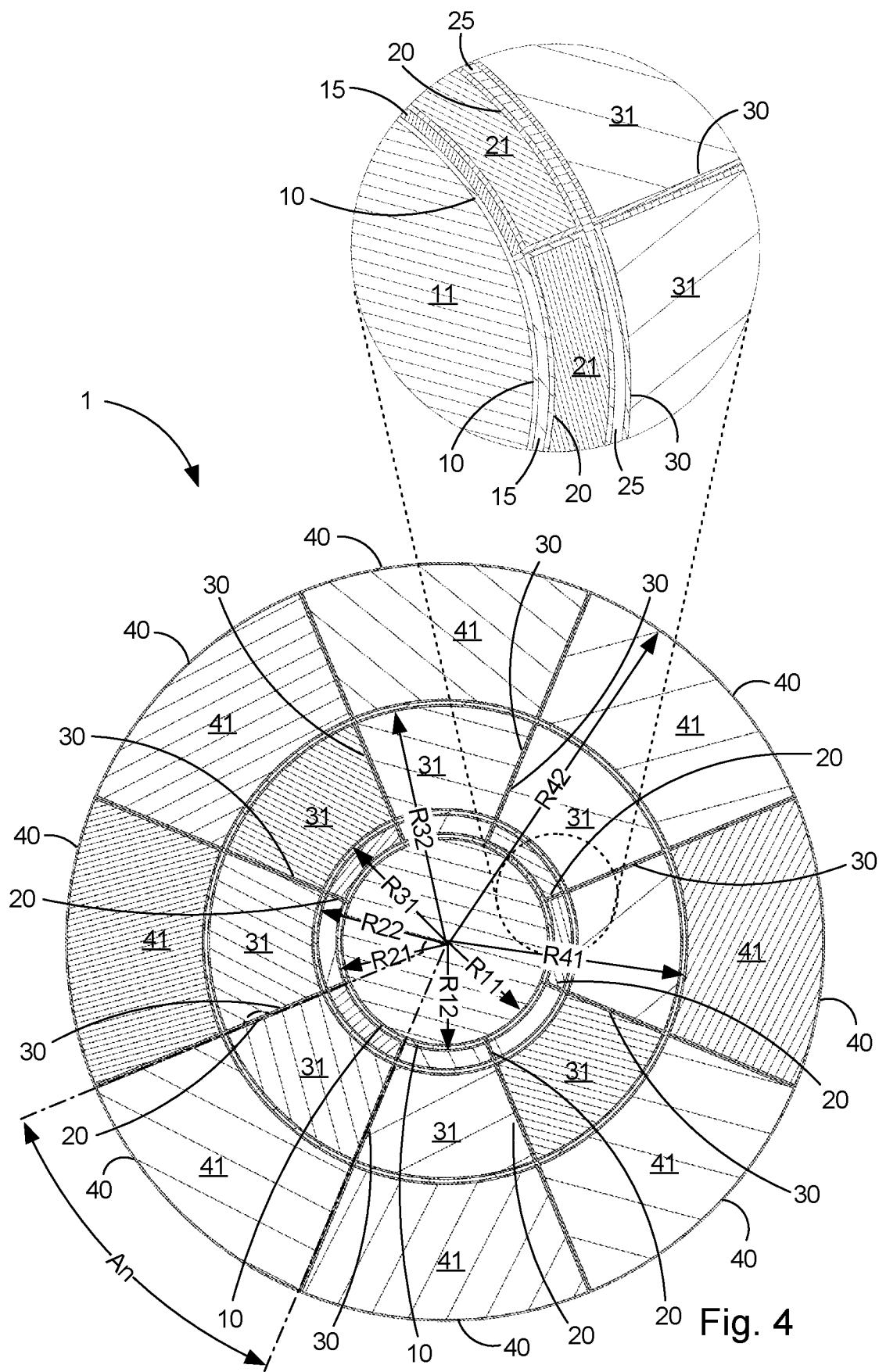
FIG. 4 is a cross-sectional view of the nuclear reactor core of FIG. 2 including an enlarged detail.
Figure 5:
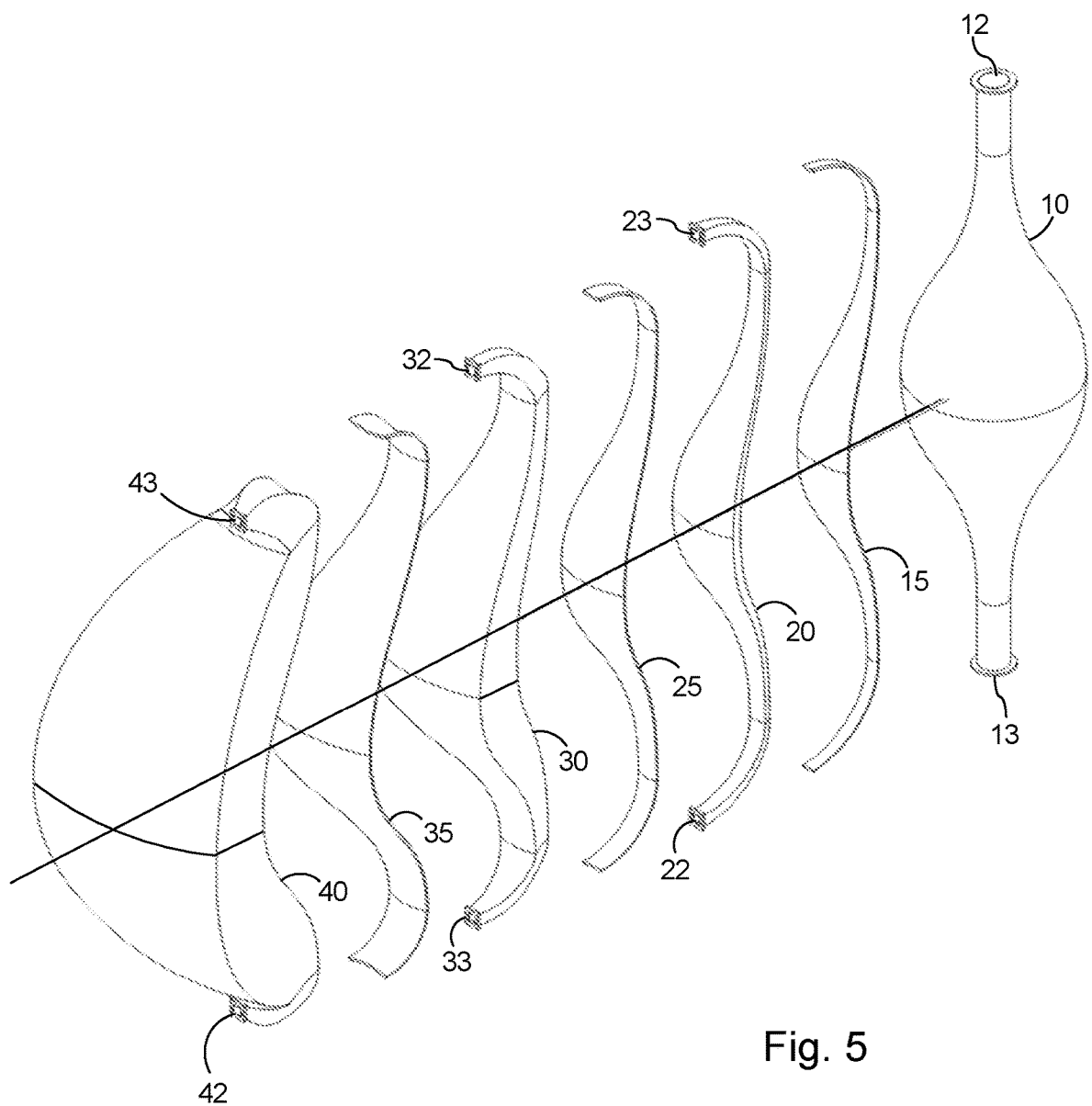
FIG. 5 is an elevated and exploded view of a portion of the nuclear reactor core of FIG. 2.
Figure 6:
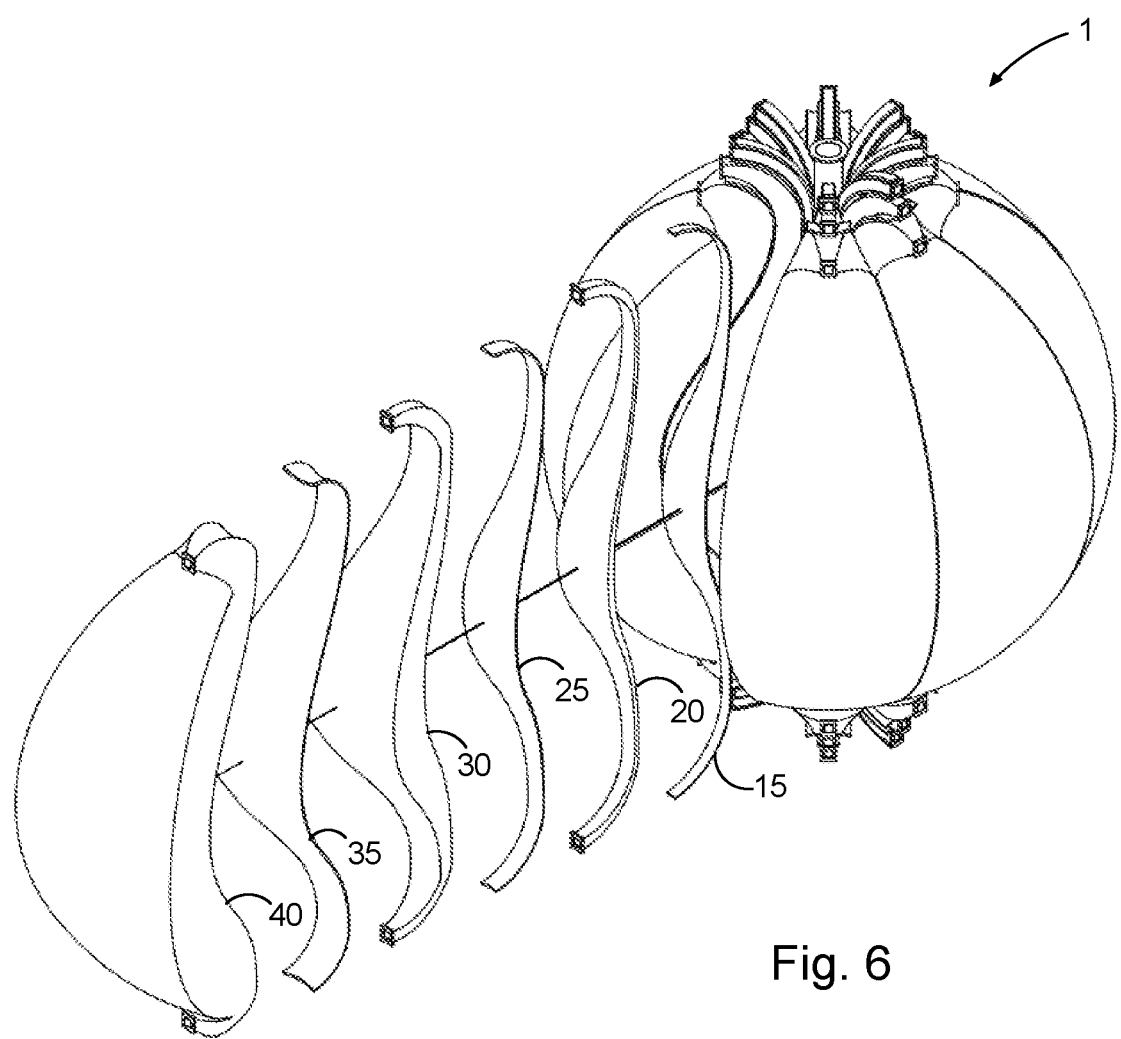
FIG. 6 is an elevated and exploded view of a portion of the nuclear reactor core of FIG. 2 together with the remaining non-exploded portions of the nuclear reactor core.
Figure 7:
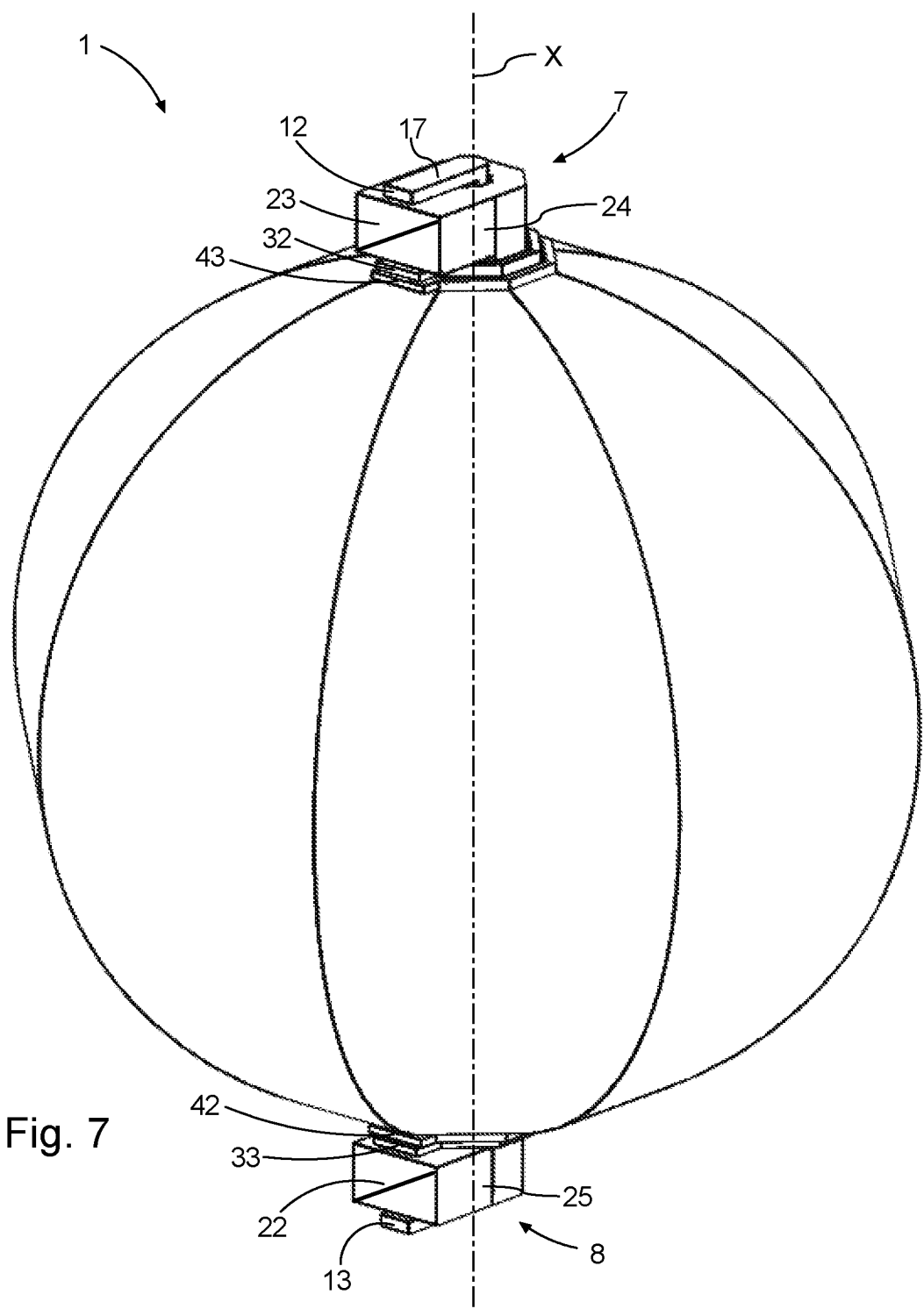
FIG. 7 is elevated view of a nuclear reactor core according to another embodiment.
Figure 8:
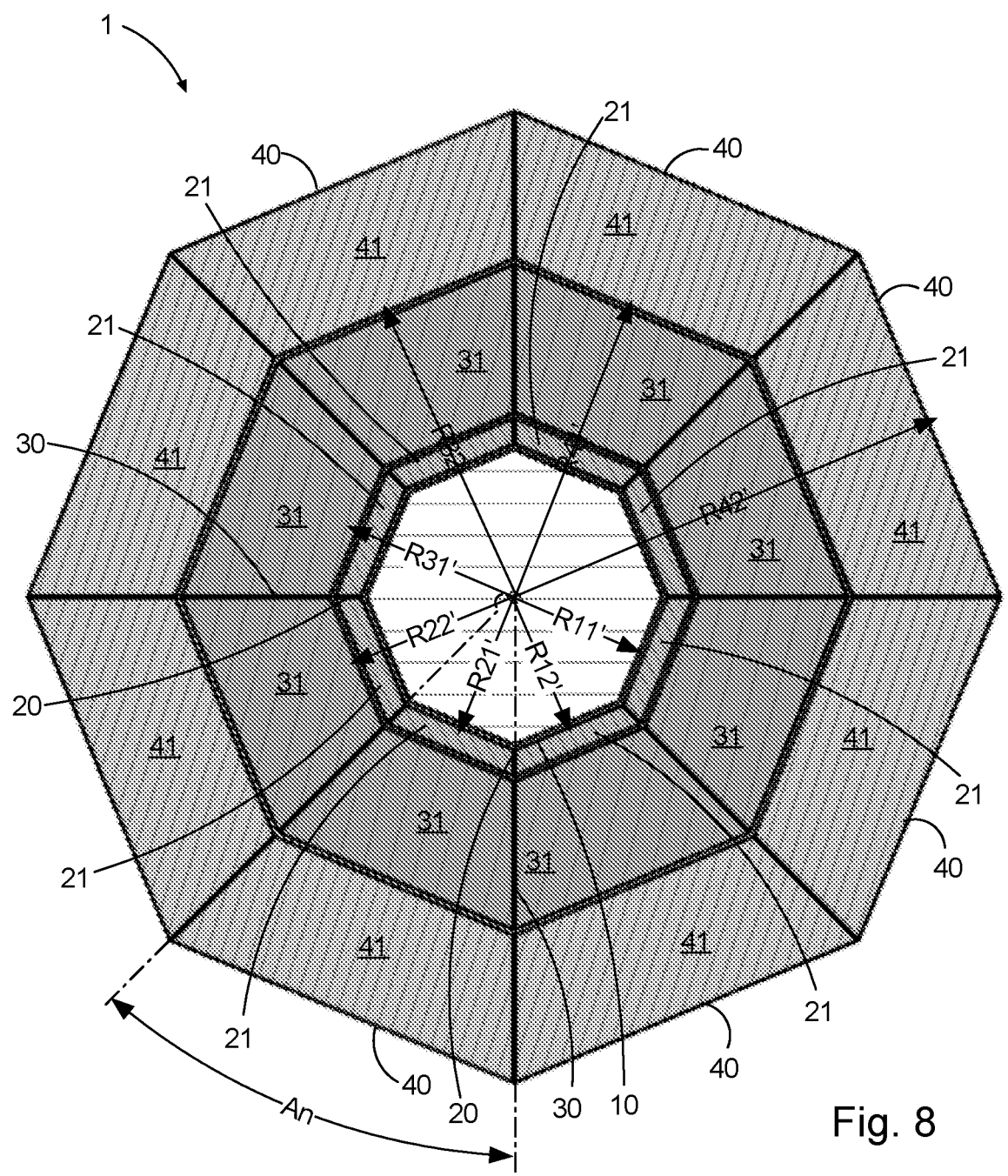
FIG. 8 is a cross-sectional view of the nuclear reactor core of FIG. 7.

FIG. 1 illustrates an embodiment of a molten salt nuclear reactor 100 using an embodiment of the nuclear reactor core 1. The molten salt nuclear corrector 100 uses a plurality of flow machines 2 (pumps) for circulating the molten fuel salt. Each flow machine 2 is connected to a heat exchanger 3 via a fuel salt loop 4, a reactor coolant loop 5, and a secondary coolant loop 6 for heat exchanging with the nuclear reactor core 1. The fuel salt loop 4 provides fuel salt for driving and controlling the nuclear reaction. Further, the heat exchangers 3 provide the reactor coolant and secondary coolants via the fuel salt loop 4 and the reactor coolant loop 5, and secondary coolant loop 6. In order to circulate and drive the flow of molten salt, flow machines 1 (pumps) are used.

With reference to FIGS. 2 to 6, an embodiment of the nuclear reactor core 1 is shown with an inlet and/or outlet area 7 at the upper end and an inlet and/or outlet area 8 at the lower end.

The nuclear reactor core 1 has an axis X and extends along the axis X extends between an inlet and/or outlet inlet area 7 and the inlet and/or outlet area 8.

In the shown embodiment, the nuclear reactor core 1 is substantially cylindrical and a portion thereof is substantially spherical. The nuclear reactor core 1 has a cylindrical and concentric construction. A tubular center moderator and neutron reflector vessel 10 extends along the axis X. In the present embodiment, the tubular center moderator and neutron reflector vessel 10 is substantially cylindrical. The tubular center moderator and neutron reflector vessel 10 provides for passage of a liquid moderator and neutron reflector 11 between a liquid moderator and neutron reflector inlet 12 and a liquid moderator and neutron reflector outlet 13. The liquid moderator and neutron reflector can be heavy water or a molten hydroxide, such as molten enriched lithium 7 deuteroxide salt (7LiOD) or sodium hydroxide or potassium hydroxide or mixtures thereof.

The center moderator and neutron reflector vessel 10 has a largest inner cross-sectional area medially between the liquid moderator inlet 12 and the liquid moderator and neutron reflector outlet 13. The inner cross-sectional area of the center moderator and neutron reflector vessel 10 preferably increasing gradually towards a medial position between the liquid moderator and neutron reflector inlet 12 and the liquid moderator and neutron reflector outlet 13 the inner cross-sectional area of the center moderator and neutron reflector vessel 10 preferably varying continuously between the moderator and neutron reflector inlet 12 and the moderator and neutron reflector outlet 13. Thus, for the cylindrical embodiment, the center moderator and neutron reflector vessel 10 has a varying inner radius. The inner radius is varied in a way such as to achieve a semi-spherical shape of the cylindrical center moderator and neutron reflector vessel 10. The center moderator and neutron reflector vessel 10 has variable inner and outer radii R11 and R12, the inner and outer radii R11 and R12 preferably being largest at or near the medial position and gradually decreasing from the medial position. During operation of the nuclear reactor core 1, the center moderator and neutron reflector vessel 10 is at least partially filled or completely with a liquid moderator neutron reflector 11, and the liquid moderator and neutron reflector 11 is exchanged at a controlled rate by flow through the moderator and neutron reflector vessel 10.

The cylindrical center moderator and neutron reflector vessel 10 is in an embodiment a wall of a metal alloy, preferably iron alloy (when the moderator and neutron absorption liquid is heavy water), preferably stainless steel, and most preferably zirconium alloy or ceramic composite material. The ceramic composite material is in an embodiment ceramic matrix composite. The ceramic matrix composite comprises ceramic fibers embedded in a ceramic matrix. The fibers and the matrix both can consist of any ceramic material, whereby carbon and carbon fibers can also be regarded as a ceramic material. The ceramic composite material is in an embodiment a composite of silicon carbide and carbon, e.g. carbon fiber-carbon matrix (C/C) composite, silicon carbide fiber-silicon carbide matrix (SiC/SiC) composite, and or silicon carbide fiber-carbon matrix (SiC/C) composite.

A cylindrical fuel salt jacket extends along the axis X between the inlet and outlet area 7,8 and surrounds the center moderator and neutron reflector vessel 10. The fuel salt jacket is formed by assembling a plurality of tubular fuel salt vessels 20. Each tubular fuel salt vessel 20 extends axially from a fuel salt inlet 22 to a fuel salt outlet 23 for passage of a molten fuel salt 21. Each fuel salt vessel 20 in the fuel salt jacket is substantially identical to the other fuel salt vessels 20 in the fuel salt jacket. During operation of the nuclear reactor core 1, the fuel salt jacket 20 is at least partially or completely filled with fuel salt 21, and the fuel salt 21 is exchanged at a controlled rate by flow through the fuel salt vessels 20.

A first cylindrical insulation jacket is provided between the center moderator vessel 10 and the fuel salt jacket. The first insulation jacket is formed by one or more first insulation members 15. The first insulation members 15 can, as shown, be shaped like sectors of the first cylindrical insulation jacket. Alternatively, the first insulation members 15 can be shaped as a strip that is spirally wound around the center moderator vessel 10. The first insulation members 15 are in an embodiment made of a graphite felt or insulation aerogel impregnated graphite felt. The first insulation jacket 15 allows a much lower heat loss to the moderator and neutron reflector liquid 11 and for the moderator and neutron reflector liquid 11 to be consistently kept operating at a much lower temperature than the fuel salt.

The cylindrical fuel salt jacket is shaped to match the shape of the cylindrical center moderator and neutron reflector vessel 10 (with the first insulation jacket therebetween), i.e. complementary therewith. Hence, the inner radius of the fuel salt jacket varies in a similar way to the outer radius of the cylindrical center moderator and neutron reflector vessel 10, such that the first insulation jacket 15 fits in between.

The fuel salt jacket is shaped as a hollow circular cylinder with variable inner and outer radii R21 and R22. The fuel salt vessels 20 are preferably shaped as a circular cylindrical sector with variable inner and outer radii R21 and R22, respectively, and a given sector angle A2, the inner and outer radii R21 and R22 preferably being largest at or near the medial position and gradually decreasing from the medial position. In the present embodiment, the sector angle is the same for all elements of the nuclear reactor core 1 and hence the sector angle has been indicated in FIG. 4 as "An".

However, it should be understood that the sector angle "An" does not need to be the same for the various jackets and not even for the various vessels that make up a single jacket. The fuel salt jacket is a circumferentially substantially continuous jacket that is formed by the matching sides of the tubular fuel salt vessels 20 touching one another along a substantial portion of their axial extent.

A cylindrical moderator and neutron reflector jacket surrounds the cylindrical fuel salt jacket. The cylindrical moderator and neutron reflector jacket is formed by assembling a plurality of tubular moderator and neutron reflector vessels 30. Each tubular moderator neutron reflector vessel 30 extends axially from a liquid moderator and neutron reflector inlet 32 to a liquid moderator and neutron reflector outlet 33 for passage of a liquid moderator and neutron reflector 31. The elements that make up the tubular moderator neutron reflector vessel 30 have walls of ceramic composite material or metal alloy, preferably zirconium alloy. The ceramic composite material is in an embodiment ceramic matrix composite. The ceramic matrix composite comprises ceramic fibers embedded in a ceramic matrix. The fibers and the matrix both can consist of any ceramic material, whereby carbon and carbon fibers can also be regarded as a ceramic material. The ceramic composite material is in an embodiment a composite of silicon carbide and carbon, e.g. carbon fiber-carbon matrix (C/C) composite, silicon carbide fiber-silicon carbide matrix (SiC/SiC) composite, and or silicon carbide fiber-carbon matrix (SiC/C) composite. In an embodiment each moderator neutron reflector vessel 30 in the moderator neutron reflector jacket 30 substantially identical to the other moderator neutron reflector vessels 30 in the fuel salt jacket.

The moderator and neutron reflector jacket is shaped as a hollow circular cylinder with variable inner and outer radii R31 and R32. The moderator neutron reflector vessels 30 are shaped as a circular cylindrical sector with variable inner and outer radii R31 and R32, respectively, and a given sector angle A3. The inner and outer radii R31 and R32 are largest at or near the medial position and gradually decrease from the medial position.

During operation of the nuclear reactor core 1, the moderator and neutron reflector jacket is at least partially filled or completely with a liquid moderator neutron reflector 31, and the liquid moderator and neutron reflector 31 is exchanged at a controlled rate by flow through the moderator and neutron reflector vessels 30.

A second cylindrical insulation jacket is provided between the fuel salt jacket and the moderator and neutron absorption jacket. The second insulation jacket is formed by one or more second insulation members 25. The second insulation members 25 can, as shown, be shaped like sectors of the second cylindrical insulation jacket. Alternatively, the second insulation members 25 can be shaped as a strip that is spirally wound around the fuel salt jacket. The second insulation members 25 are in an embodiment made of a graphite felt or insulation aerogel impregnated graphite felt. The second insulation jacket allows a much lower heat loss to the moderator and neutron reflector liquid 31 and for the moderator and neutron reflector liquid 31 to be consistently kept operating at a much lower temperature than the fuel salt 21.

An optional blanket salt jacket surrounds the moderator and neutron absorption jacket, preferably with a third insulation jacket there between. The blanket salt jacket comprises a plurality of tubular blanket salt vessels 40, each tubular blanket salt vessel 40 extending axially from an inlet 42 to an outlet 43 for passage or be constructed without blanket salt inlet and outlet holding of a molten blanket salt 41 in a stationary fashion. The plurality of tubular blanket salt vessels 40 is assembled to form a cylindrical blanket salt jacket surrounding the moderator and neutron reflector jacket.

The blanket salt jacket is shaped as a hollow circular cylinder with variable inner and outer radii R41 and R42. The blanket salt vessels 40 are shaped as a circular cylindrical sector with variable inner and outer radii R41 and R42, respectively, and a given sector angle A4. The inner and outer radii R41 and R42 are largest at or near the medial position and gradually decrease from the medial position. The blanket salt jacket can be constructed without blanket salt inlets and outlets, in which the blanket salt 41 is not continuously exchanged and could be either maintained molten, near its melting point to prevent radiolysis of the blanket salt, or frozen.

A third cylindrical insulation jacket is provided between the neutron reflector vessel and the blanket salt jacket. The third insulation jacket is preferably formed by one or more third insulation members 35. The third insulation members 35 can be shaped like sectors of the third cylindrical insulation jacket or shaped as a strip that is spirally wound around the moderator and neutron reflector jacket. The third insulation members 35 are preferably made of a graphite felt or insulation aerogel impregnated graphite felt.

In an embodiment (not shown) the insulation sheets are clad in e.g. 0.01 to 0.1 mm sheet metal to eliminate or at least reduce the risk of salt wicking into the insulation if a vessel breaks. In the insulation sheets, it would then be hard to release decay heat, which, could result in salt boiling and possible pressure build-up, i.e. a highly undesirable situation.

The fuel salt vessels 20, the moderator and neutron reflector vessels 30, and/or the blanket salt vessels 40 are, in an embodiment, each assembled from two parts that are separated by a symmetry plane M that extends radially from the medial position (radially relative to axis A). The inlet and outlet sections of these vessels 20, 30, and 40 can, as shown, curve radially outward and be provided with a flange or the like for connection to piping. However, it should be understood that the inlet and outlet sections can also extend axially and do not need to be provided with a flange for connection to piping since other solutions for connecting the vessels 20, 30, and 40 to piping are known in the art. The inlet and outlet 12,13 of the moderator and neutron reflector vessel 10 are in an embodiment provided with a flange for connection to pumping, but it is understood that the inlet and outlet 12,13 can be formed without a flange and be connected to piping by another form of assembly.

The vessels 20, 30, and 40 and possibly their inlet and outlet sections are held together by a structure that is not shown in the figures for reasons of simplicity. Such support structures are thought well known in the art.

The design of the nuclear reactor core 1 is an attempt to obtain a nuclear reactor core that is as spherical as achievable, but still constructible from materials that can withstand the harsh conditions in the nuclear reactor core 1 while allowing for a sufficient fuel salt circulation rate to extract the produced heat. The result is a design with a structure that is both cylindrical and spherical, as well as both layered and segmented, i.e. resembling a hybrid of the layered structure and shape of onions and the segmented structure and shape of citrus fruit.

Traditional ceramics are relatively brittle, have relatively low thermal shock resistance, and relatively low fracture toughness. Ceramic composite materials or ceramic matrix composite materials are made from short, continuous, or braided ceramic fiber material, usually embedded in a ceramic matrix, providing reinforcement of the matrix ceramic. Ceramic composites subdue or at least reduce the drawbacks of traditional ceramics.

The fibers and the matrix are made from a variety of ceramic materials and in a variety of different processes resulting in differences in mechanical properties, such as strength and porosity, and impurity content. Most common commercially available ceramic composite materials are made from carbon and/or silicon carbide fibers and carbon or silicon carbide matrix, abbreviated (C/C), (C/SiC), (SiC/C), and (SiC/SiC). Both naturally occurring carbon, mainly containing the carbon 12 isotope, and silicon, mainly containing silicon 28 isotope, have low neutron capture probability in a thermal neutron energy spectrum. Furthermore, both carbon and silicon carbide have good corrosion resistance to the molten salt used in the molten salt reactor, i.e. both are corrosive resistant to molten salt and have low neutron absorption in the thermal spectrum. However, both are too brittle to be used as a construction material for vessels and jackets in a molten salt nuclear reactor core. Yet, their ceramic composites are interesting candidates for use as construction material in molten salt reactors because of their relatively high fracture toughness and high thermal shock resistance combined with their low neutron absorption in the thermal spectrum and exceptional resistance to radiation damage.

The construction of the vessels (moderator and neutron reflector vessel 10, and/or moderator and neutron reflector vessels 30 and/or fuel salt vessels 20 and/or blanket salt vessels 40) from ceramic composites comprises lay-up and fixation, where ceramic fiber or resin impregnated ceramic fibers are wound or placed in or around a mold/core, giving the part the shape of the final ceramic composites part, then polymer is infiltrated into the fibers, then the part is cured. After curing the part is demolded (removed from mold/core) and the polymer is pyrolyzed in a furnace at high temperatures, usually above 800° C. in an inert atmosphere to form the matrix composite (in an embodiment the mold/core is a one use mold/core that is burned, melted, crushed or destroyed after first use. This leaves the part porous and the part is re-infiltrated (resin impregnated) and the pyrolyzing step is repeated until the desired porosity is reached.

Several minor variations of the above process can be used, however, all these processes depend on the first step of shaping the fibers and polymer in a mold and/or on a core. This limits the geometry of the jackets, vessels, and other parts that can be manufactured, since the jackets, vessels and other parts of the nuclear reactor core 1 have to be able to release from the mold or fixture (core) with the vessel in its final form, allowing for some intermediate and or final machining to tolerances. The process does not allow for the creation of complex shapes compared to traditional metal casting, manufacturing, such as forming (e.g. forging, rolling, extruding, die forming, indenting, stretching, deep drawing, stamping, and bending), and machining (e.g. turning, drilling, boring, milling, and cutting) but more technically challenging compared with machining conventional metal parts. However, the disclosed construction and geometry of the present nuclear reactor core allows each of the vessels and jackets to be manufactured by the commercially available processes for manufacturing parts in composite ceramic material.

In an embodiment (not shown in the FIGS.), the center moderator vessel 10 is segmented and formed by a plurality of tubular moderator vessels, each moderator vessel extending axially from a moderator inlet to a moderator outlet for passage of a moderator, the plurality of tubular moderator vessels being assembled to form the center moderator vessel 10. In a variation of this embodiment, the center moderator vessel 10 has a circumferential outer wall and a circumferential inner wall, the circumferential inner wall creating a lumen for receiving a control rod. The control rod is of a neutron absorbing material such as boron or hafnium.

In an embodiment (not shown in the FIGS.) a second fuel salt jacket surrounds the moderator and neutron reflector jacket, and a second moderator and neutron reflector jacket surrounds the second fuel salt jacket. In this embodiment, the blanket jacket, if present, surrounds the second neutron reflector jacket. In this embodiment, the second fuel salt jacket is formed by a plurality of tubular fuel salt vessels, each tubular fuel salt vessel extending axially from a fuel salt inlet to a fuel salt outlet for passage of a molten fuel salt 21, the plurality of tubular vessels being assembled to form a second cylindrical fuel salt jacket surrounding the moderator and neutron reflector jacket. The second neutron reflector jacket is formed by a plurality of tubular moderator and neutron reflector vessels. Each tubular moderator neutron reflector vessel extending axially from a liquid moderator and neutron reflector inlet to a liquid moderator and neutron reflector outlet for passage of a liquid moderator and neutron reflector.

In an embodiment (not shown), the nuclear reactor core 1 is provided with movable neutron absorbing control elements between vessels of the jackets, preferably between vessels making up the fuel salt jacket and/or between vessels forming a jacket that surrounds the fuel jacket or is surrounded by the fuel jacket. The neutron absorbing control elements are similar to control rods, except that the neutron absorbing control elements are not rod-shaped but are shaped like a plate or wedge to match the adjacent vessels in the jacket concerned, and are arranged such that they can be inserted into and retracted from the nuclear reactor core 1, for controlling nuclear reactivity of the nuclear reactor core.

In an embodiment, the reactivity of the nuclear chain reaction of the nuclear reactor core 1 is controlled by controlling the fuel salt temperature in the fuel salt jacket to remain at a temperature between approximately 600 and 700° C., and controlling the moderator and neutron reflector liquid in the central moderator and neutron reflector vessel 10 to remain at a temperature between approximately 10 and 90° C. Preferably also the temperature of the moderator and neutron reflector liquid 21 in the moderator and neutron reflector jacket 20 is controlled to remain at a temperature between approximately 10 and 90° C.

The method of controlling the reactivity of the nuclear chain reaction and temperature household of the nuclear reactor core 1 may further comprise:

adjusting the liquid level or mass of the liquid moderator and neutron reflector 11 in the central moderator and neutron reflector vessel 10, and/or adjusting the liquid level or mass of the liquid moderator and neutron reflector 31 in the moderator and neutron reflector jacket 30, and/or adjusting the liquid level or mass of the molten blanket salt 41 in the blanket salt jacket 40, and/or adjusting the temperature of fuel salt 21 through the fuel jacket 20, and/or adjusting the temperature of the liquid moderator and neutron reflector 11 in the center moderator and neutron reflector vessel 10, and/or adjusting temperature of the liquid moderator and neutron reflector 31 in the center moderator and neutron reflector jacket 30, and/or adjusting the chemical composition of the fuel salt 21, and/or adjusting the chemical composition of the liquid moderator and neutron reflector 11, 31, and/or adjusting the position of a control rod that is at least partially inserted in a lumen in the center moderator and neutron reflector vessel 10, and/or adjusting the position of a control rod that is at least partially inserted between fuel salt vessels 20, and/or adjusting the position of a control rod that is at least partially inserted between moderator and neutron absorption vessels 30.

Increasing the liquid level or mass of the liquid moderator and neutron reflector in the central moderator and neutron reflector vessel 10, increases the reactivity of the nuclear chain reaction by providing more moderation and or reflection, and vice versa.

Increasing the liquid level or mass of the liquid moderator and neutron reflector in the moderator and neutron reflector jacket 30, increases the reactivity of the nuclear chain reaction by providing more moderation and or reflection and or less neutron leakage, and vice versa.

Increasing the liquid level or mass of the molten blanket salt 41 in the blanket salt jacket 40, if present, increases the reactivity of the nuclear chain reaction by providing more reflection and or less neutron leakage, and vice versa. The liquids may not always have a nice flat surface for determining the amount of liquid in the vessel concerned, since the flow rate can be quite high, so the surface may have waves, bubbles and be foamy/frothy. Furthermore, if the liquid moderator is flowing or being sprayed into the vessel concerned, the stream or droplets of the liquid moderator will contribute to the moderation. Thus, in an embodiment, it is the mass of liquid in the vessel concerned that is adjusted.

Increasing the temperature of the fuel salt in the fuel salt jacket 20, decreases the reactivity of the nuclear chain reaction by providing a lower average density in the nuclear reactor core and thus the presence of less fissile fuel, and vice versa.

Increasing the temperature of the liquid moderator and neutron reflector in the center moderator and neutron reflector vessel 10, decreases the reactivity of the nuclear chain reaction by providing a lower average density in the nuclear reactor core and thus more moderation and or reflection, and vice versa. Increasing the temperature of the liquid moderator and neutron reflector in the moderator and neutron reflector jacket, decreases the reactivity of the nuclear chain reaction by providing a lower average density in the nuclear reactor core and thus more moderation and or reflection and or more neutron leakage, and vice versa.

Adding fissile material to the fuel salt 21 increases the reactivity of the nuclear chain reaction, and vice versa. Adding fertile material, e.g. thorium, or neutron absorbing material to the fuel salt 21 decreases the reactivity of the nuclear chain reaction, and vice versa.

Adding fertile material, e.g. thorium, or neutron absorbing material to the moderator and reflector liquid 11, 31 decreases the reactivity of the nuclear chain reaction, and vice versa.

Temperatures of the respective moderator liquid 11, 31 or fuel salt 21 are changed by e.g.:

increasing the flow rate resulting a smaller temperature drop across the nuclear reactor core 1 and thus a higher or lower density, and/or adjusting the cooling rate of the moderator liquids 11,31 or fuel salt 21 outside the nuclear reactor core 1 resulting in shifting the average temperature over the nuclear reactor core 1 and thus higher or lower densities.

The liquid level or mass of the respective moderator liquid 11,31 or fuel salt 21 or molten blanket salt 41 is changed by e.g. adjusting the rate at which liquid is pumped in the respective vessel or jacket from the top and the rate at which the liquid is passively allowed to drain from the bottom.

In an embodiment (not shown), a controller, e.g. an electronic control unit is coupled to the elements of the molten salt nuclear reactor 100 and configured to control the reactivity of the nuclear reactor core 1 in accordance with the measures described above.

The embodiments above have been described with reference to a reactor core in which the cross sectional outline of the center moderator and neutron reflector vessel 10, and the fuel salt jacket, and the neutron reflector jacket and if present also the blanket salt jacket 41 have a cross-sectional outline that is close to perfectly circular.

FIGS. 7 to 11 illustrate another embodiment of the nuclear reactor core 1. In this embodiment, structures and features that are the same or similar to corresponding structures and features previously described or shown herein are denoted by the same reference numeral as previously used for simplicity. In this embodiment the cross sectional outline of the center moderator and neutron reflector vessel, the fuel salt jacket, and the neutron reflector jacket, and if present also the blanket salt jacket has a polygon cross-sectional outline. The polygon cross-sectional outline preferably has at least three sides, so that the outline approaches a circular outline, i.e. the outline approaches a circular outline and the resulting vessel and jackets have a substantially cylindrical shape, with a corresponding effective radius. The shown embodiment has eight sides so that it resembles an octagon, but it should be understood that any number of sides above four could be used. In this embodiment, the first, second, and third insulation jackets 15,25, 35 are not shown in the drawings, but it is understood that these insulation jackets 15,25,35 may be included in this embodiment.

The center moderator and neutron reflector vessel 10 has variable inner and outer effective radii R11' and R12'. The inner and outer effective radii R11' and R12' are preferably largest at or near the medial position and gradually decreasing from the medial position. In this embodiment, the effective radius is the radius of a circle that best approximates the cross-sectional polygon outline of the element concerned.

The fuel salt jacket is shaped as a hollow circular cylinder with variable effective inner and outer radii R21' and R22'. The fuel salt vessels 20 are preferably shaped as a substantially circular cylindrical sector with variable effective inner and outer radii R21' and R22', respectively, and a given sector angle A2, the inner and outer effective Radii R21' and R22' preferably being largest at or near the medial position and gradually decreasing from the medial position.

The moderator and neutron reflector jacket is shaped as a hollow substantially circular cylinder with variable effective inner and outer radii R31' and R32'. The moderator neutron reflector vessels 30 are shaped as a circular cylindrical sector with variable effective inner and outer radii R31' and R32', respectively, and a given sector angle A3. The effective inner and outer Radii R31' and R32' are largest at or near the medial position and gradually decrease from the medial position.

The blanket salt jacket is shaped as a hollow substantially circular cylinder with variable effective inner and outer radii R41' and R42'. The blanket salt vessels 40 are shaped as a circular cylindrical sector with variable effective inner and outer radii R41' and R42', respectively, and a given sector angle A4. The effective inner and outer Radii R41' and R42' are largest at or near the medial position and gradually decrease from the medial position.

By using vessels and blankets that have a polygon cross-sectional outline, the sheet material that forms the surfaces of these elements does not need to be double curved, i.e. can be single curved, which is an advantage for those elements that are made of sheet metal, since it is much easier and more effective to bend sheet metal in only one direction compared to bending in two directions to produce double curved sheet metal. Single curved sheet metal can be very simply produced, e.g. using roll bending, was double curved sheet metal items typically require a dedicated mold, thereby significantly increasing the production costs. The elements that are made of sheet metal are manufactured by assembling a plurality of curved sheet metal items by welding the sheet metal items along the seam. Preferably such sheet metal is relatively thin, e.g. 1 to 2 mm.

Figure 9:
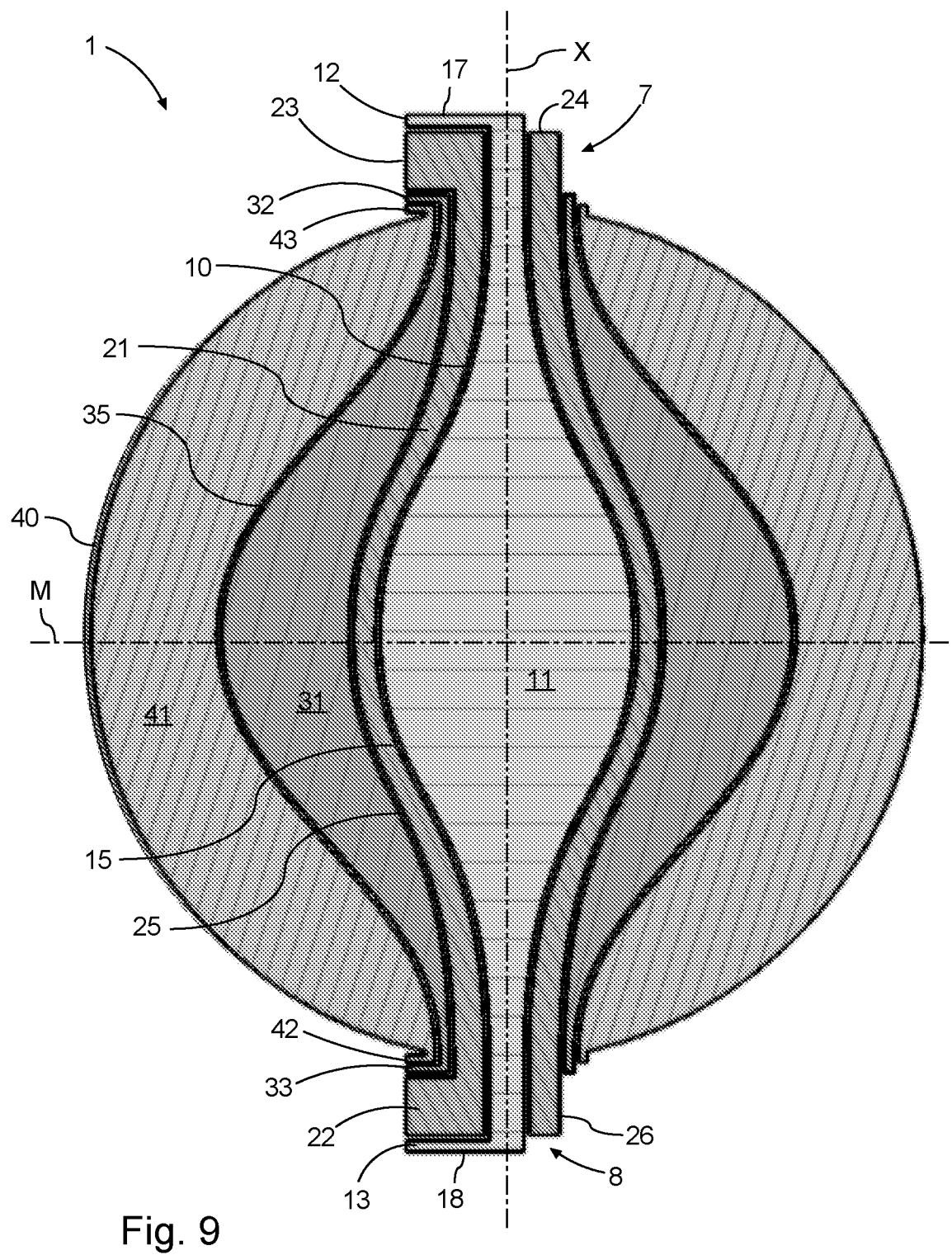
FIG. 9 is a sectional view of the nuclear reactor core of FIG. 2.
Figure 10:
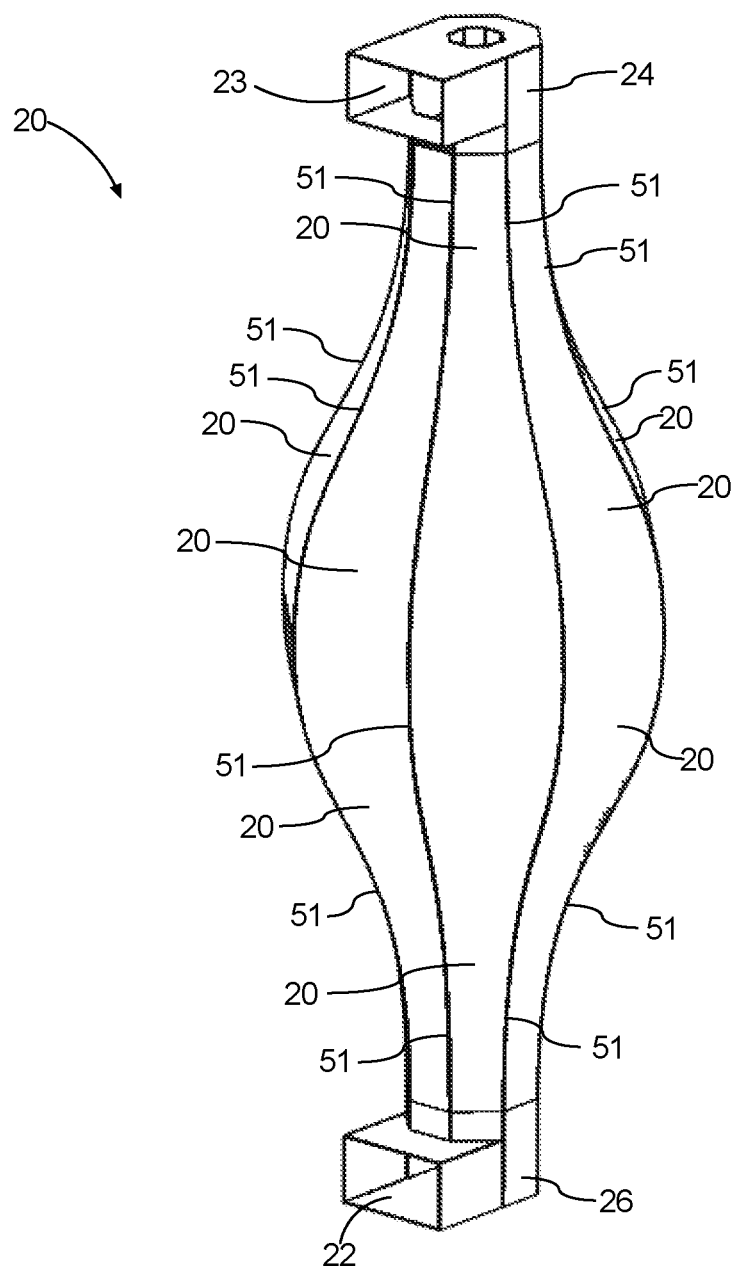
FIG. 10 is an isolated elevated view of the fuel salt jacket of the nuclear reactor core of FIG. 2.
Figure 11:
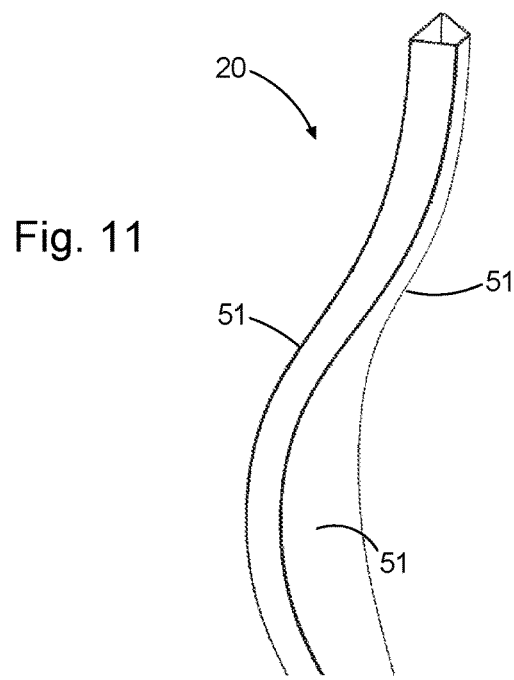
FIG. 11 is an isolated elevated view of a vessel of the fuel salt jacket of FIG. 10.

FIG. 9 shows the fuel salt jacket, assembled from a plurality of tubular fuel salt vessels 20. Each tubular fuel salt vessel 20 (shown in detail in FIG. 10), is formed by a plurality of bend sheet metal items that are joined by welds 51. In the inlet/outlet area 7, the fuel salt jacket with a preferably substantially right angled outlet element 24 is welded to the fuel salt jacket. The outlet element 24 comprises the fuel salt outlet 23 and connects to the tubular fuel salt vessels 20 of the fuel salt jacket. The outlet element 24 can be constructed from the same material, preferably sheet material, as the material used for the tubular fuel salt vessels 20. In the inlet/outlet area 8, the fuel salt jacket is connected with a substantially right angled inlet element 26 that is welded to the fuel salt jacket. The inlet element 26 comprises the fuel salt inlet 22 and connects to the tubular fuel salt vessels 20 of the fuel salt jacket. The inlet element 26 can be constructed from the same material, preferably sheet material, as the material used for the tubular fuel salt vessels 20.

Returning to FIG. 8, the tubular substantially cylindrical center moderator and neutron reflector vessel 10 is provided in the inlet/outlet area 7 with a substantially right angled inlet element 17 that comprises the liquid moderator and neutron reflector inlet 12 and is provided in the inlet/outlet area 8 with a substantially right angled outlet element 18 that comprises the liquid moderator and neutron reflector outlet 13.

The moderator and neutron reflector jacket is provided in the inlet/outlet area 7 with a substantially right angled inlet element that comprises the liquid moderator and neutron reflector inlet 32 and is provided in the inlet/outlet area 8 with a substantially right angled inlet element that comprises the liquid moderator and neutron reflector outlet 33.

The blanket jacket is provided in the inlet/outlet area 7 with a substantially right angled outlet element that comprises the blanket salt outlet 43 and provided in the inlet/outlet area 8 with a substantially right angled inlet element that comprises the blanket salt inlet 42.

Figure 12:
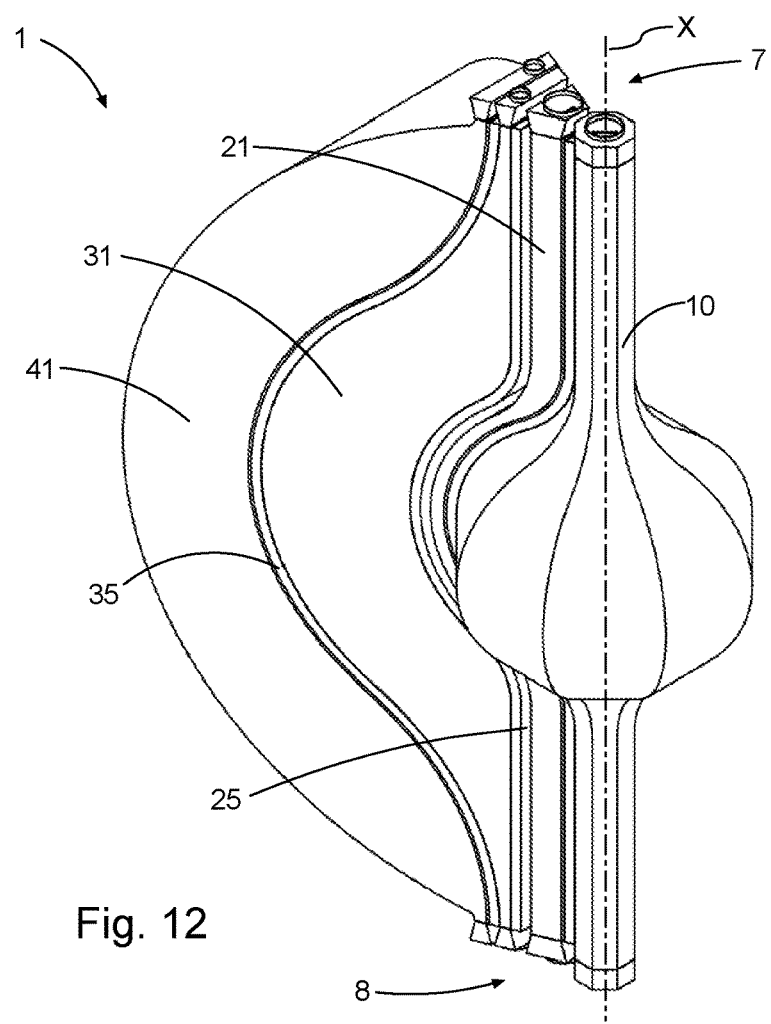
FIG. 12 is a cut open elevated view of another embodiment of the nuclear reactor core.

FIG. 12 is a cut open elevated view of another embodiment of the nuclear reactor core. In this embodiment, structures and features that are the same or similar to corresponding structures and features previously described or shown herein are denoted by the same reference numeral as previously used for simplicity. the embodiment of FIG. 12 is essentially identical to the embodiment of FIGS. 7 to 11, except that the vessels and jackets do not vary in diameter/cross-sectional area throughout all of their axial extent. Instead, the portions of their axial extent closer to the inlet/outlet areas 7 and 8 have a constant cross-sectional area.

In an embodiment (not shown), the vessels that are manufactured from composite or metal have stiffing added to increase mechanical properties. The stiffening can be formed by internal struts or ribs, internal or external "iso grid" or "ortho grid" like structure. The vessels of a jacket are in embodiment held together by welding, latches, or bands e.g. extending around the segments like rings (hoops) around a barrel that hold together the staves, with the vessels of a jacket being held together in a similar fashion to the way that the staves of the barrel held together.

In an embodiment (not shown), the vessels are manufactured from metal and surrounded by a composite cage manufactured to provide mechanical support and stability to the metal vessel. In such an embodiment the neutron absorption from the metal can be reduced by providing some or most of the mechanical integrity with a low neutron absorbing composite material.

In an embodiment where water or heavy water is used as the liquid moderator a small addition of 7LiOD, or other hydroxide or deuteroxide, is added for pH control, as is common in many solid fuel and heavy moderated reactors.

In an embodiment where water or heavy water is used as the liquid moderator a large addition of 7LiOD, or other hydroxide, deuteroxide, or other salt, is added in order to suppress the melting point of the liquid moderator to allow for lower temperature operation a larger margin to solidification. Lowering the melting point increases the density of the liquid moderator and thus the moderation capability but also shifts the reactor neutron spectrum to lower energies where neutron reproduction factor can be come larger for certain fissile fuels.

In an embodiment where water or heavy water is used as the liquid moderator, an active or passive recombiner is used to re-associate any formation of gasses from the radiolysis of the liquid moderator.

The various aspects and implementations have been described in conjunction with various embodiments herein. However, other variations to the disclosed embodiments can be understood and effected by those skilled in the art in practicing the claimed subject-matter, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The reference signs used in the claims shall not be construed as limiting the scope. Unless otherwise indicated, the drawings are intended to be read (e.g., cross-hatching, arrangement of parts, proportion, degree, etc.) together with the specification, and are to be considered a portion of the entire written description of this disclosure. As used in the description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

The invention claimed is:

1. A nuclear reactor core (1) for a molten salt nuclear reactor (100), said nuclear reactor core (1) comprising:
 a first tubular vessel (10) having an inner radius and a first inlet (12) and a first outlet (13) and a first passage communicating from said first inlet and said first outlet, said tubular vessel characterized by a first axis extending from said first inlet (12) to said first outlet (13) with said first passage extending along the first axis,
 a plurality of second tubular vessels (20), each of the plurality of second tubular vessels (20) having a second inlet (22) and a second outlet (23) and a second passage communicating from said second inlet and said second outlet,
 a plurality of third tubular vessels (30), each of the plurality of third tubular vessels (30) having a third inlet (32) and a third outlet (33) and a third passage communicating from said third inlet and said third outlet (33),
 wherein
 said plurality of second tubular vessels (20) are assembled to form a first jacket surrounding said first tubular vessel (10),
 said plurality of third tubular vessels (30) are assembled to form a second jacket, said second jacket surrounding said first jacket, and
 the first tubular vessel (10) has a first bulbous outer contour, and
 the first inlet (12) has an inner cross-sectional area on a first plane that is transverse to the first axis that is smaller than an inner transverse cross-sectional area of a medial portion of the first tubular vessel (10) disposed between the first inlet (12) and the first outlet (13), and
 the first outlet (13) has an inner cross-sectional area on a second plane that is transverse to the first axis that is smaller than the inner transverse cross-sectional area of the medial portion of the first tubular vessel (10) disposed between the first inlet (12) and the first outlet (13).

2. The nuclear reactor core (1) according to claim 1, wherein the first tubular vessel (10) inner radius increases gradually from the first inlet (12) toward the medial portion and also increases gradually from the first outlet toward the medial portion.

3. The nuclear reactor core (1) according to claim 1, wherein the first tubular vessel (10) comprises a wall of metal alloy.

4. The nuclear reactor core (1) according to claim 1, wherein each of the plurality of second tubular vessels (20) is identical to all other second tubular vessels (20) of the plurality of second tubular vessels.

5. The nuclear reactor core (1) according to claim 1, wherein a first insulation jacket is provided between said first tubular vessel (10) and said first jacket.

6. The nuclear reactor core (1) according to claim 1, wherein an insulation jacket is provided between the first jacket and the second jacket.

7. The nuclear reactor core (1) according to claim 1, further comprising a plurality of tubular blanket salt vessels (40), said plurality of tubular blanket salt vessels (40) being assembled to form a bulbous blanket salt jacket surrounding the second jacket (30).

8. The nuclear reactor core (1) according to claim 7, wherein an insulation jacket is provided between said second jacket and the blanket salt jacket.

9. The nuclear reactor core (1) according to claim 1, wherein said first tubular vessel (10) is assembled from two parts.

10. The nuclear reactor core (1) according to claim 1, wherein said first tubular vessel (10) has variable inner and outer radii R11 and R12.

11. The nuclear reactor core (1) according to claim 10, wherein second vessels (20) are shaped as a substantially circular cylindrical sector with variable inner and outer radii R21 and R22 or effective radii R21' and R22', respectively, and a given sector angle A2, said inner and outer radii R21 and R22 or effective radii R21' and R22' being largest at or near said medial position and gradually decreasing from said medial position.

12. The nuclear reactor core (1) according to claim 1, wherein said second jacket is shaped as a tube with variable inner and outer radii R31 and R32.

13. The nuclear reactor core (1) according to claim 8, wherein said blanket salt jacket is shaped as a hollow tube with variable inner and outer radii R41 and R42 or effective radii R41' and R42'.

14. The nuclear reactor core (1) according to claim 1, wherein said first jacket, and said second jacket are circumferentially substantially continuous jackets.

15. The nuclear reactor core (1) according to claim 1, wherein said first tubular vessel (10) is segmented and formed by a plurality of tubular moderator vessels, each moderator vessel extending axially from a moderator inlet to a moderator outlet for passage of a moderator, said plurality of tubular moderator vessels being assembled to form said first tubular vessel (10).

16. The nuclear reactor core (1) according to claim 15, wherein said first tubular vessel (10) has a circumferential outer wall and a circumferential inner wall.

17. A molten salt nuclear reactor (100) comprising the nuclear reactor core (1) according to claim 1.

18. The nuclear reactor core (1) according to claim 2, wherein the first tubular vessel (10) inner radius varies continuously between the first inlet (12) and the first outlet (13).

19. The nuclear reactor core (1) according to claim 10, wherein said inner and outer radii R11 and R12 are largest at or near the medial portion and gradually decreasing from said medial position.

20. The nuclear reactor core (1) according to claim 1, wherein said first jacket has variable inner and outer radii R21 and R22.

21. The nuclear reactor core (1) according to claim 12, wherein said plurality of third vessels 30 comprise a tubular sector with variable inner and outer radii R31 and R32 or effective radii R31' and R32', respectively, and a given sector angle A2, said inner and outer radii R31 and R32 or effective radii R31' and R32', being largest at or near said medial position and gradually decreasing from said medial position.

22. The nuclear reactor core (1) according to claim 1, wherein the first jacket is shaped as a hollow tube with variable inner and outer radii R21 and R22 or effective radii.

23. The nuclear reactor core (1) according to claim 1, wherein the inner cross-sectional area of the first inlet (12) is the same as the inner cross-sectional area of the first outlet (13).

24. The nuclear reactor core (1) according to claim 1, wherein the first tubular vessel (10) has a fusiform shape.

25. The nuclear reactor core (1) according to claim 1, wherein each of the plurality of third vessels (30) comprises a wall of metal alloy.

26. The nuclear reactor core of claim 1, wherein:
the first tubular vessel contains a moderator, and said moderator comprises a fluid;
the plurality of second tubular vessels each contain a molten nuclear fuel, and the plurality of third tubular vessels each contain a moderator, and said moderator comprises a fluid.

27. The nuclear reactor core of claim 1, wherein the first tubular vessel contains a moderator, and said moderator comprises a fluid.

28. The nuclear reactor core of claim 1, wherein the plurality of second tubular vessels each contain a nuclear fuel.

29. The nuclear reactor core of claim 1, wherein the plurality of third tubular vessels each contain a moderator, and said moderator comprises a fluid.

\* \* \* \* \*